United States Patent [19]

Ohgami et al.

[11] Patent Number: 5,731,952
[45] Date of Patent: Mar. 24, 1998

[54] PORTABLE ELECTRONIC APPARATUS HAVING THE HEAT RADIATION DEVICE FOR CIRCUIT MODULE

[75] Inventors: Keizo Ohgami; Kazuya Shibasaki; Hironori Itoh, all of Tokyo, Japan

[73] Assignee: Kabushiki Kaisha Toshiba, Kawasaki, Japan

[21] Appl. No.: 615,874

[22] Filed: Mar. 14, 1996

[30] Foreign Application Priority Data

Apr. 28, 1995 [JP] Japan .................................. 7-105036

[51] Int. Cl.⁶ .................................................. H05K 7/20
[52] U.S. Cl. ........................................ 361/687; 361/697
[58] Field of Search ............................... 165/80.3, 185, 165/122, 126; 364/708.1; 454/184; 361/680, 687, 690, 710, 694–697, 704–707, 713, 717–719, 749, 776, 789

[56] References Cited

U.S. PATENT DOCUMENTS

| | | |
|---|---|---|
| 5,095,404 | 3/1992 | Chao ........................ 361/385 |
| 5,208,730 | 5/1993 | Tracy . | |
| 5,335,722 | 8/1994 | Wu . | |
| 5,339,214 | 8/1994 | Nelson . | |
| 5,377,745 | 1/1995 | Hsieh ........................ 361/697 |
| 5,513,070 | 4/1996 | Xie ........................... 361/687 |
| 5,526,875 | 6/1996 | Lin ........................... 165/80.3 |
| 5,557,500 | 9/1996 | Baucom ..................... 361/687 |
| 5,559,675 | 9/1996 | Hsieh ........................ 361/707 |
| 5,568,360 | 10/1996 | Penniman ................... 361/687 |
| 5,572,407 | 11/1996 | Sobhani ..................... 361/719 |
| 5,596,483 | 1/1997 | Wyler ........................ 361/683 |
| 5,597,034 | 1/1997 | Barker III ................... 165/80.3 |

*Primary Examiner*—Gerald P. Tolin
*Attorney, Agent, or Firm*—Limbach & Limbach, LLP

[57] ABSTRACT

A circuit module comprises a circuit board and a circuit element mounted on the circuit board and producing heat in operation. A heat conduction member, put in contact with the circuit element, for receiving the heat of the circuit element is attached to the circuit board. A metallic heat sink is detachably mounted on the heat conduction member. The heat sink comprises a radiation panel put in contact with the heat conduction member and a fan support portion formed integral with the radiation panel. The fan support portion supports a cooling fan for guiding a cooling air to the radiation panel.

20 Claims, 24 Drawing Sheets

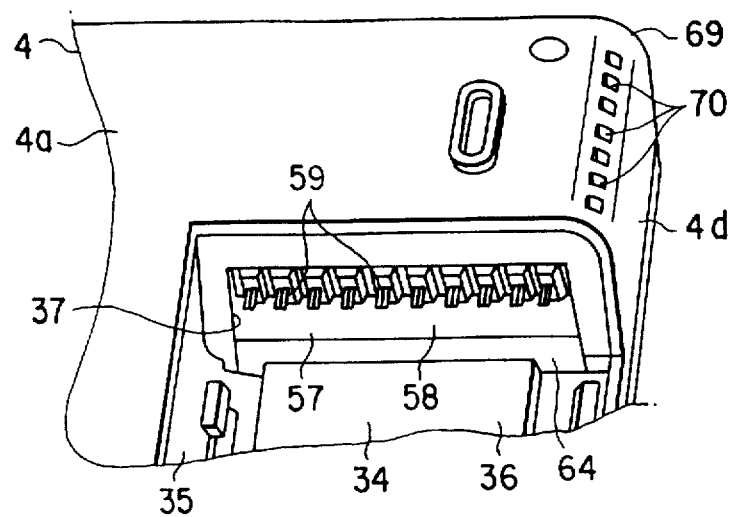
F I G. 6
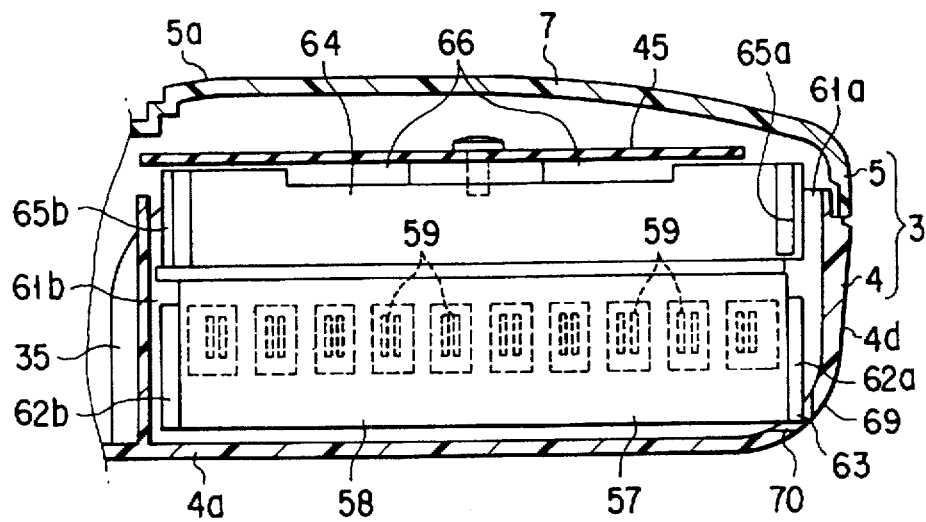
F I G. 7
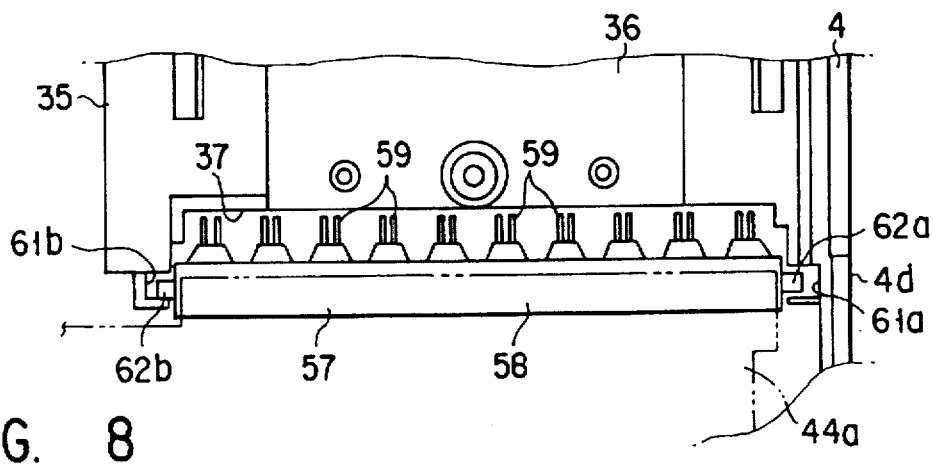
F I G. 8

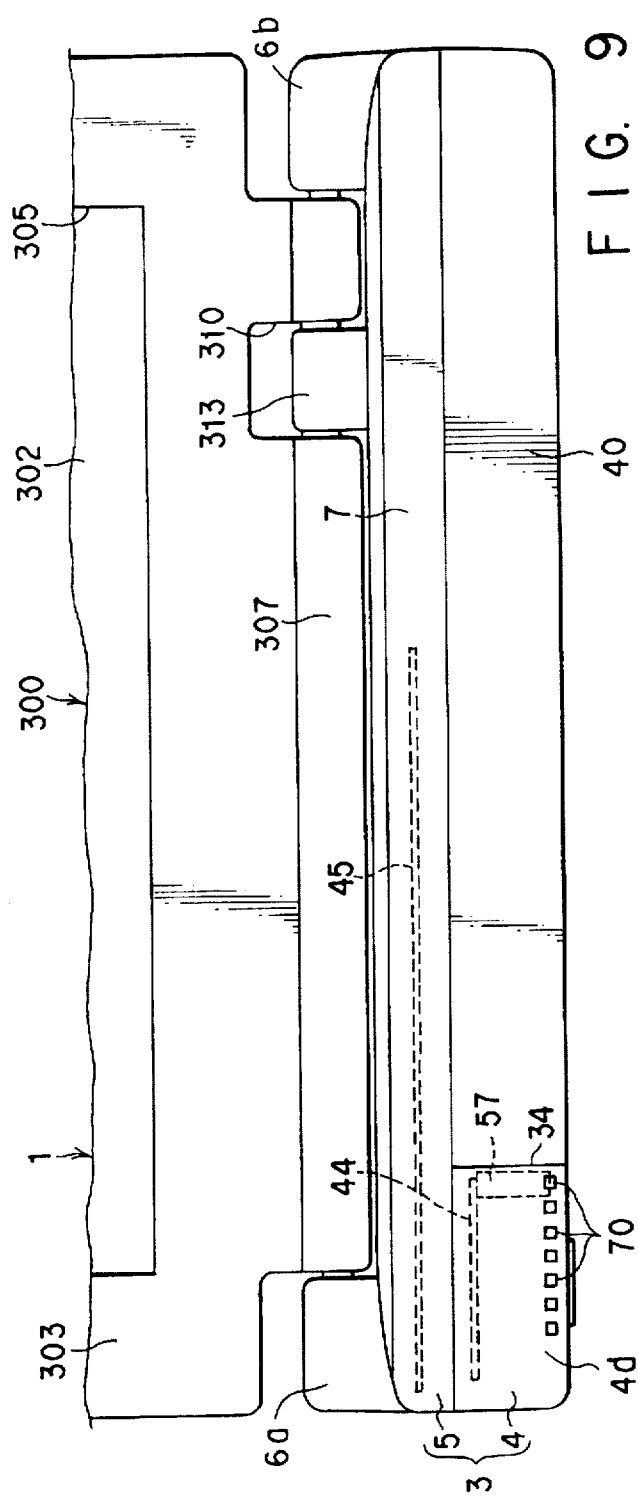
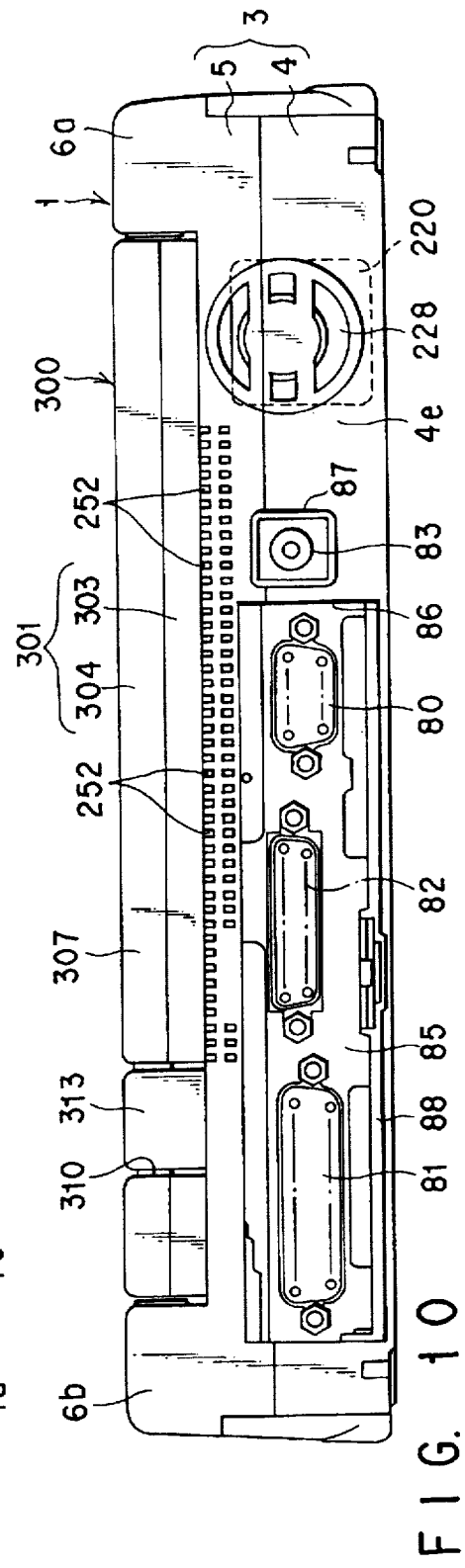

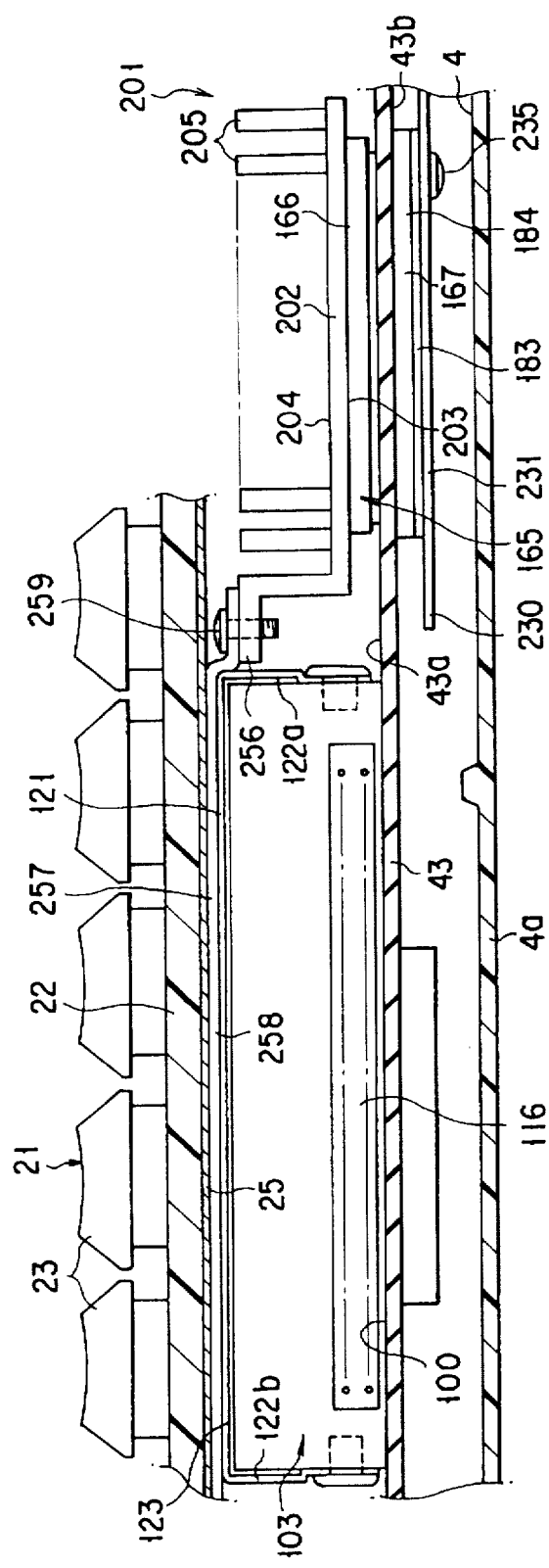
F I G. 13
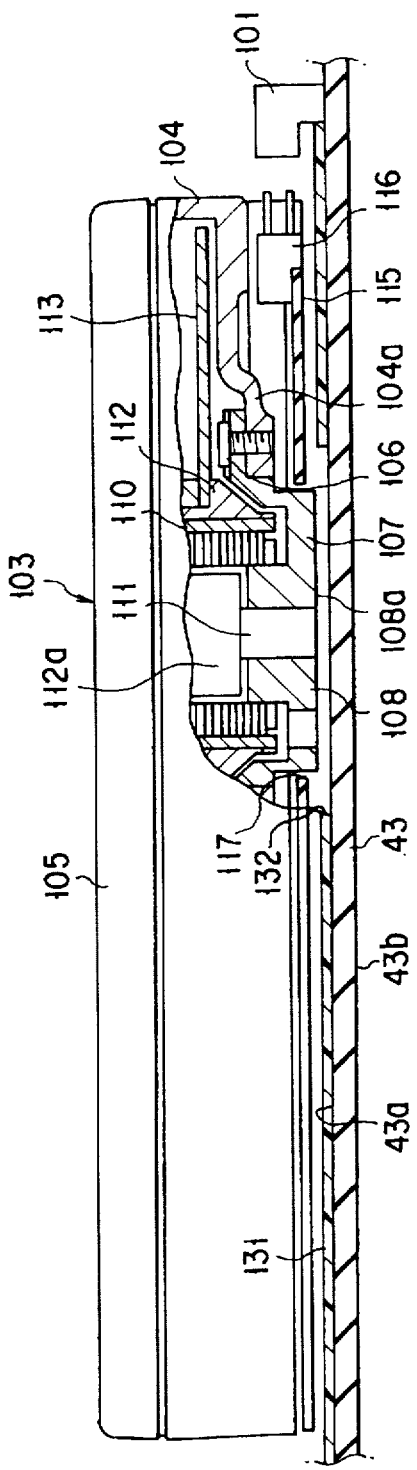
F I G. 14

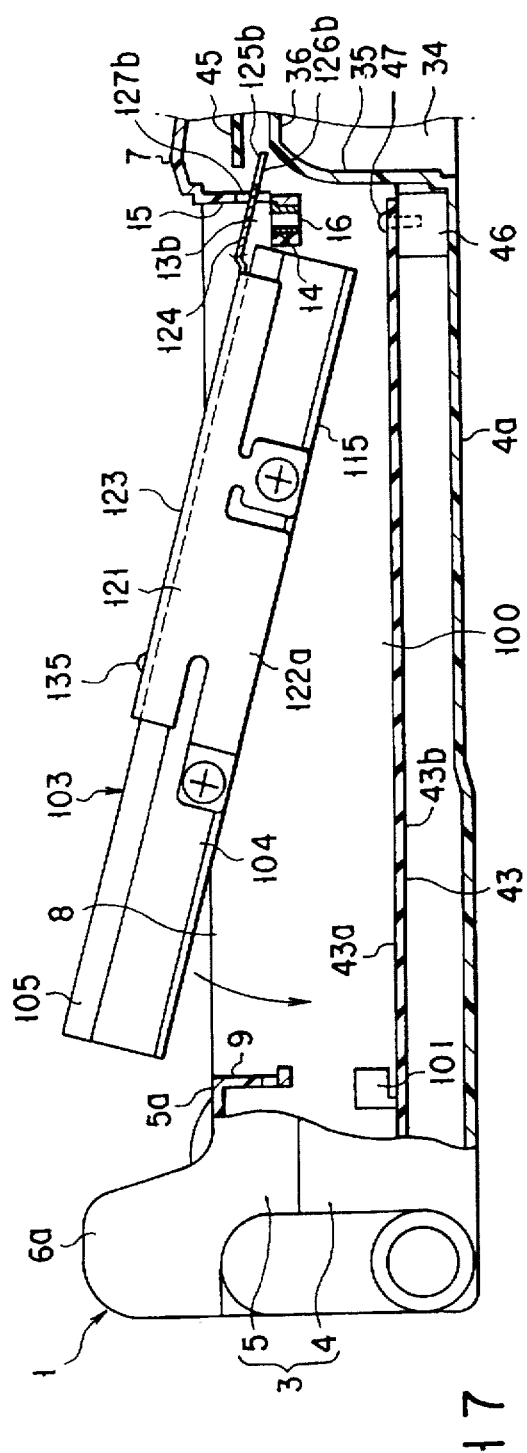
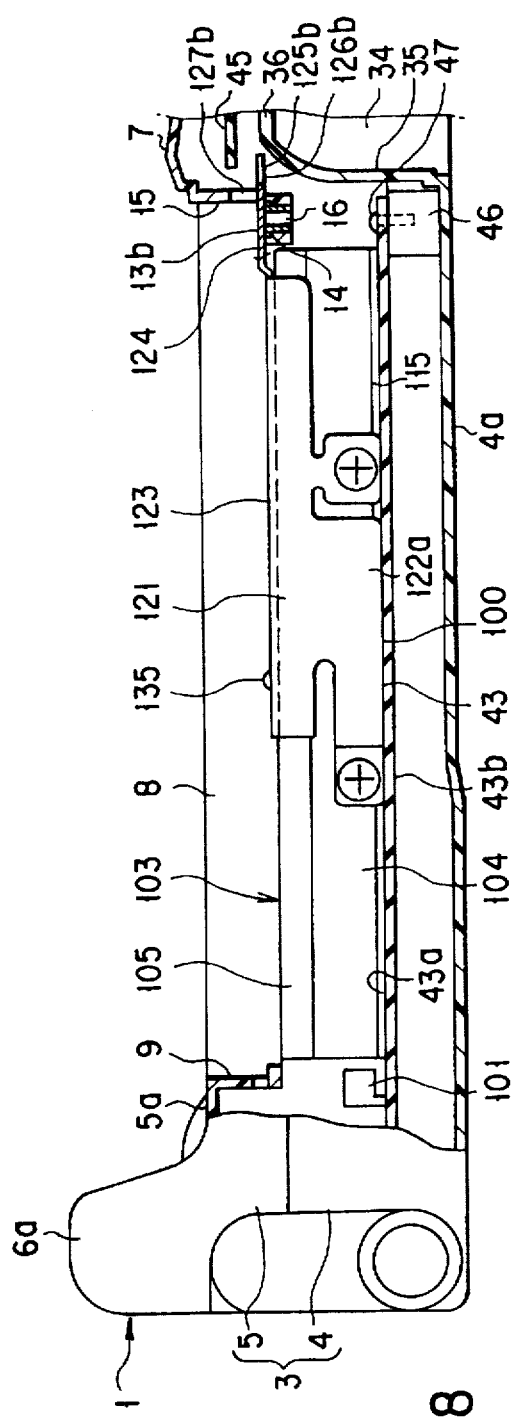
FIG. 17
FIG. 18

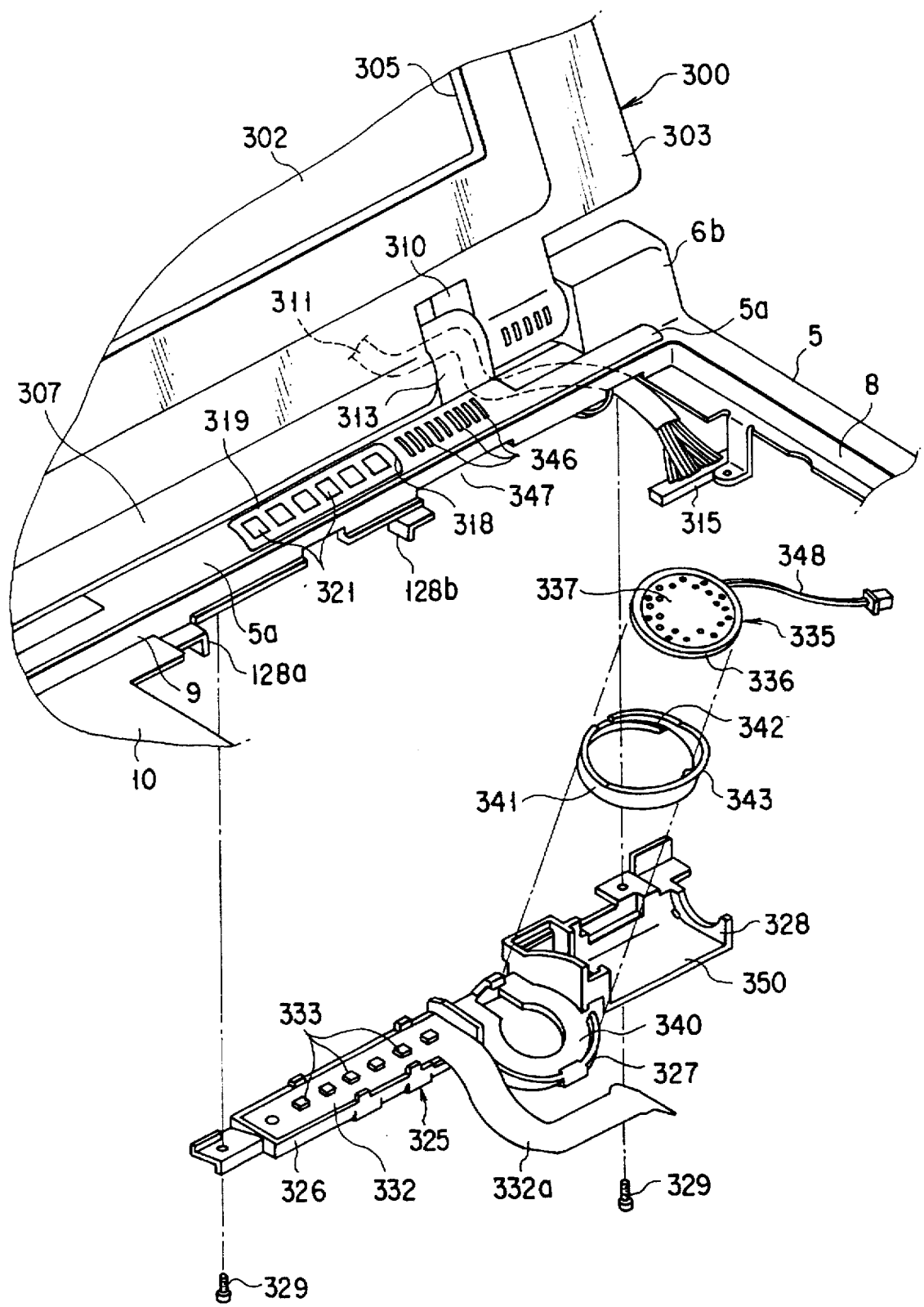
F I G. 30

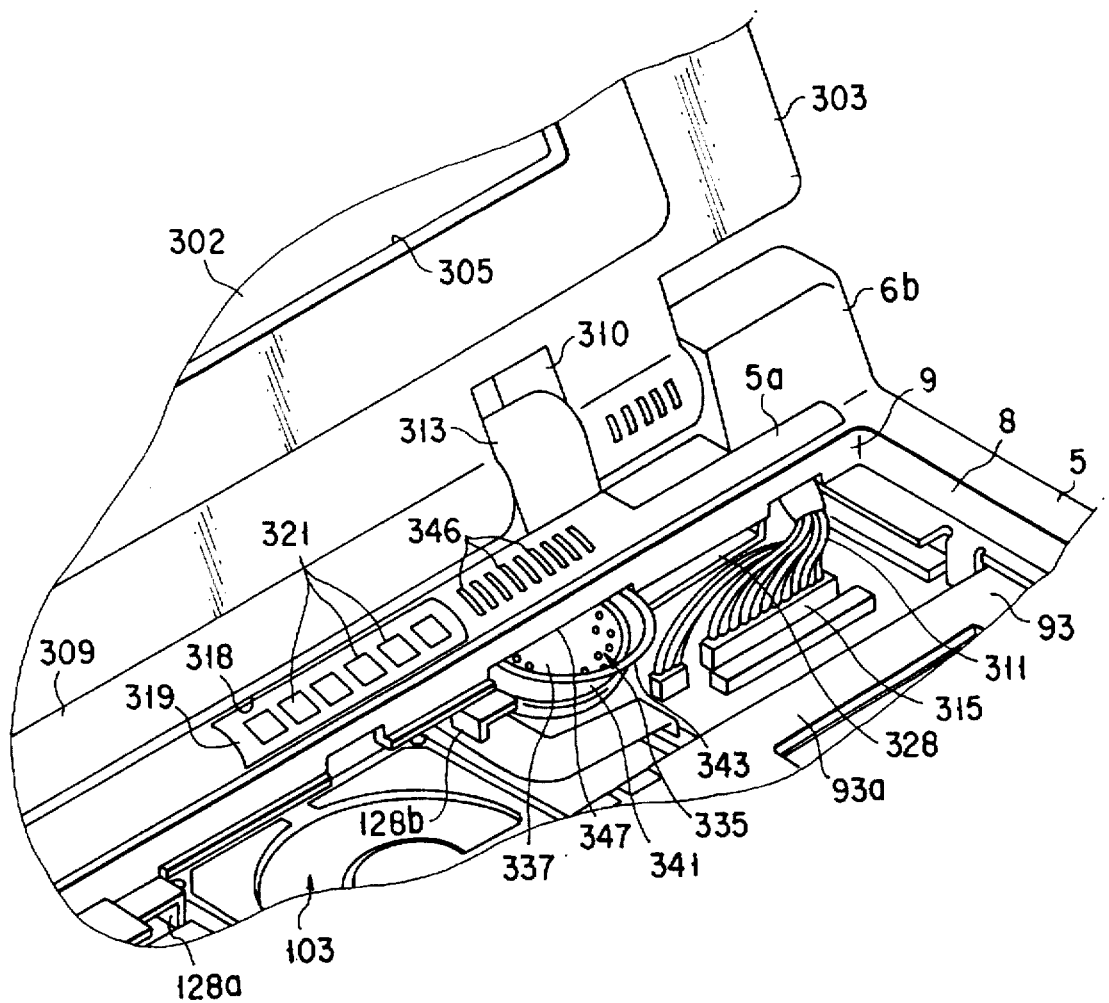
F I G. 31

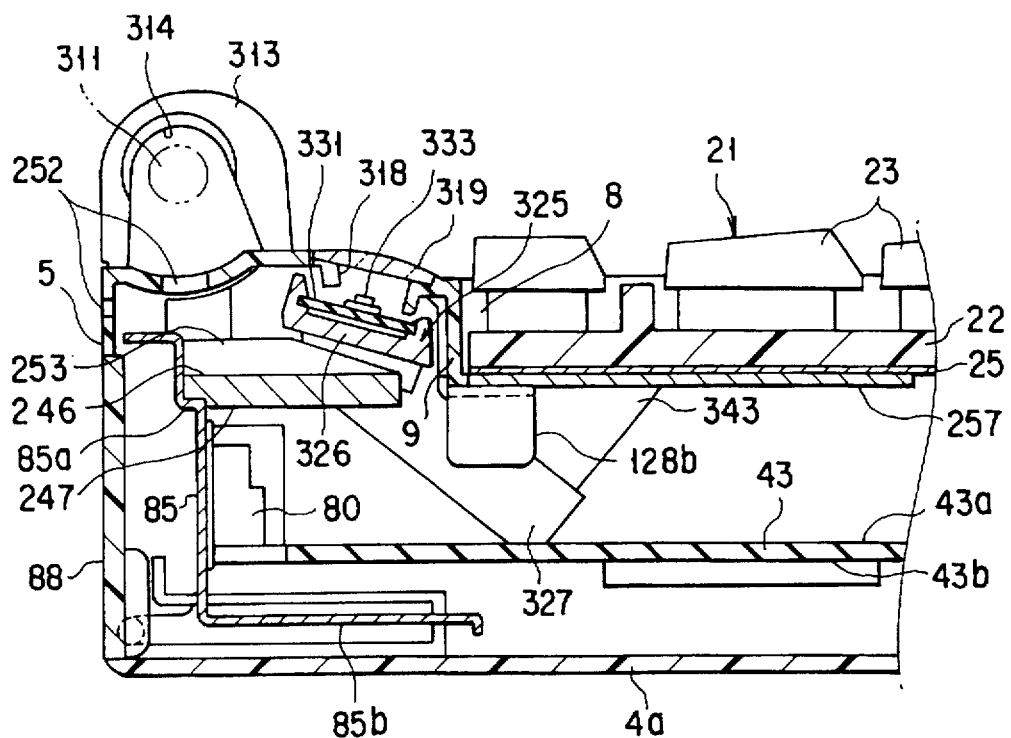
F I G. 32
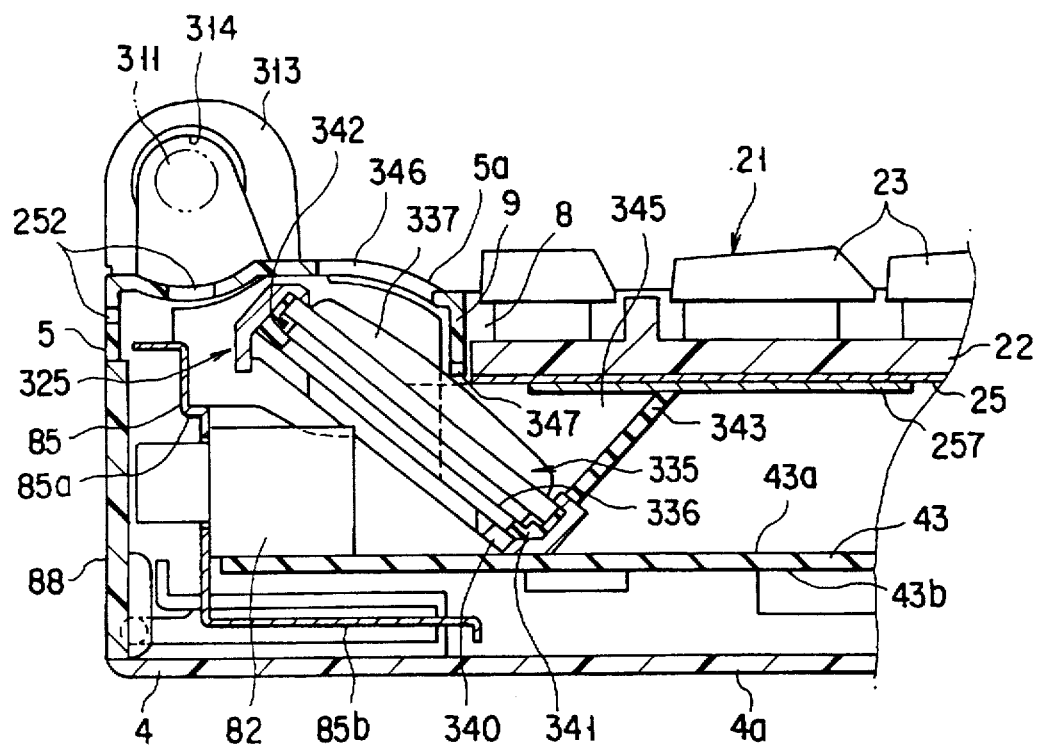
F I G. 33

PORTABLE ELECTRONIC APPARATUS HAVING THE HEAT RADIATION DEVICE FOR CIRCUIT MODULE

BACKGROUND OF THE INVENTION

1. Field of the Invention

The present invention relates generally to a portable electronic apparatus such as a portable computer having a circuit module wherein an exothermic circuit element such as a TCP (tape carrier package) is mounted on a circuit board, and more particularly to a structure for facilitating heat radiation of the circuit element.

2. Description of the Related Art

Recently developed book-type or notebook-type portable computers have been decreasing in size and increasing in number of functions. This type of computer includes a circuit module comprising a circuit board and an LSI package mounted on the circuit board. The capacity and number of functions of the LSI package have been increasing more and more, resulting in an increase in chip size and in number of pins. Consequently, the area on the circuit board, which is occupied by the LSI package, increases. In order to maintain the great number of pins while limiting the area occupied by the LSI package, the pitch of leads of the LSI package must be reduced.

Attention has recently been paid to a TCP (tape carrier package) as a compact package capable of matching with a great number of pins. The TCP comprises a resin film, a great number of leads arranged on the resin film, and an IC chip supported on the resin film. The leads have distal end portions led out of the outer periphery of the resin film. The distal end portions of the leads are attached by means of soldering to a great number of pads disposed on the circuit board.

In the TCP, the IC chip is not molded by resin and is exposed. The mechanical strength of the TCP is lower than that of a PGA (pin grid array). Although the amount of heat produced by the TCP in operation is large, it is difficult to directly attach a heat sink with many cooling fins to the IC chip. Accordingly, when the exothermic TCP is contained in a casing of the computer, it is important to enhance the heat radiation efficiency of the TCP.

There are several conventional methods for facilitating heat radiation of the TCP. Jap. Pat. Appln. KOKOKU Publication No. 5-52079 discloses an example of the heat radiation method of the TCP. In this method, a circuit board on which an electronic device including an IC chip is provided with a relatively large through-hole and a heat radiation plate. The through-hole is opposed to the IC chip of the electronic device. The heat radiation plate is situated on the side opposite to the electronic device. The heat radiation plate has a projection engaged in the through-hole. The projection is formed of a metallic material with high heat conductivity, for example, copper or brass, and it has a heat receiving surface put in contact with the electronic device. The heat of the electronic device is escaped to the heat radiation plate via the heat receiving surface and the projection.

In this heat radiation method, however, the opening area of the through-hole is much smaller than the plan shape of the electronic device, and most of the electronic device is in contact with the circuit board via a soldering layer or a thermal compound layer. As a result, the amount of heat escaped to the heat radiation plate via the projection is less than the amount of heat transmitted from the electronic device directly to the circuit board. Many circuit elements such as IC chips, other than the electronic device, are mounted on the circuit board. It is thus inevitable that heat is transmitted from the electronic device to the circuit elements. Resultant adverse affect to the circuit elements is great. Once the circuit elements are overheated, the functions of the circuit elements deteriorate.

In another method of facilitating the heat radiation of the TCP, an electric fan for feeding air is provided within the casing of the computer and the TCP is forcibly cooled by the air fed by the electric fan. In this method, the TCP must be situated on an air feed path of cooling air fed by the electric fan.

As regards recently developed portable computers, however, the size of the casing has been decreased more and more in order to enhance the portability. In addition, the casing contains at high density many functional parts such as a hard disk drive, a floppy disk drive and a card container for containing an extension card. As a result, the functional parts may interfere with the cooling air flowing towards the TCP, and the actual amount of cooing air flowing towards the TCP may decrease. Thus, heat may stay around the TCP. Although the TCP is designed to be forcibly cooled, the heat radiation of the TCP may become inadequate.

SUMMARY OF THE INVENTION

A first object of the present invention is to provide a circuit module cooling device capable of facilitating heat radiation of a circuit element while reducing thermal affect on a circuit board, and realizing common use of a heat radiation part by standardizing a heat conduction member receiving heat from the circuit element, and to provide a portable electronic apparatus having the cooling device.

A second object of the invention is to provide a portable electronic apparatus capable of broadly diffusing heat of a circuit element and efficiently radiating the heat of the circuit element.

In order to achieve the first object, there is provided a cooling apparatus for cooling a circuit module, the apparatus comprising:

a circuit board;

a circuit element mounted on the circuit board and producing heat during operation;

a heat conduction member attached the circuit board, the heat conduction member being put in contact with the circuit element and receiving the heat from the circuit element;

a metallic heat sink detachably attached to the heat conduction member, the heat sink including a heat radiation panel put in contact with the heat conduction member and a fan support portion formed integral with the heat radiation panel; and a cooling fan, supported on the fan support portion of the heat sink, for guiding a cooling air to the heat radiation panel.

In the above structure, when the circuit element produces heat, the heat of the circuit element is directly conducted to the heat conduction member. Since the heat radiation panel of the heat sink is put in contact with the heat conduction member, the heat of the circuit element conducted to the heat conduction member is let to escape to the heat radiation panel. Since the cooling air is guided to the heat radiation panel by means of the cooling fan, the heat radiation panel is forcibly cooled. Since the cooling fan is supported on the heat radiation panel, the flow of the cooling air to the heat radiation panel is not shielded and a sufficient amount of cooling air can be led to the surrounding of the heat radiation panel. Accordingly, the heat radiation performance of the heat radiation panel is enhanced and the heat of the circuit element conducted via the heat conduction member can be let to escape to the outside of the circuit board with high efficiency.

The heat sink is removable from the heat conduction member. Thus, even if the shape and dimensions of the apparatus are changed due to a design change of the apparatus in which the circuit board is to be built, it should suffice if the heat sink alone is newly designed. Therefore, the specifications of the heat conduction member can be standardized and the common use of parts is achieved.

In order to achieve the first object, there is also provided a portable electronic apparatus comprising:

a box-shaped casing having cooling air inlets;

a circuit board contained within said casing;

a circuit element mounted on said circuit board and producing heat during operation;

a heat conduction member attached to said circuit board, said heat conduction member being put in contact with said circuit element and receiving the heat of the circuit element;

a metallic heat sink detachably attached to the heat conduction member, the heat sink including a heat radiation panel put in contact with the heat conduction member and a fan support portion formed integral with the heat radiation panel; and a cooling fan, supported on the fan support portion of the heat sink, for introducing air into the inside of the casing through the cooling air inlets and guiding the air to the heat radiation panel.

In the above structure, when the circuit element produces heat, the heat of the circuit element is directly conducted to the heat conduction member. Since the heat radiation panel of the heat sink is put in contact with the heat conduction member, the heat of the circuit element conducted to the heat conduction member is let to escape to the heat radiation panel. The cooling fan supported on the heat sink sucks air from the outside of the casing via the cooling air inlets, and the sucked air is guided to the heat radiation panel as cooling air. Thus, the heat radiation panel is forcibly cooled. Since the cooling fan is supported on the heat radiation panel, the flow of the cooling air to the heat radiation panel is not shielded and a sufficient amount of cooling air can be led to the surrounding of the heat radiation panel. Accordingly, the heat radiation performance of the heat radiation panel is enhanced and the heat of the circuit element conducted via the heat conduction member can be let to escape to the outside of the circuit board with high efficiency.

The heat sink is removable from the heat conduction member. Thus, even if the shape and dimensions of the casing are changed due to a design change of the casing in which the circuit board is to be built, it should suffice if the heat sink alone is newly designed. Therefore, the specifications of the heat conduction member can be standardized and the common use of parts is achieved.

In order to achieve the second object, there is provided a portable electronic apparatus comprising:

a box-shaped casing having an upper wall in which a mounting hole is formed;

input means for inputting information, said input means being disposed in said mounting hole in the casing, the input means having a lower surface exposed to the inside of the casing via the mounting hole, said lower surface being covered with a metallic reinforcement plate;

a circuit board contained within the casing;

a circuit element mounted on said circuit board and producing heat during operation;

a heat sink, contained within the casing, for radiating the heat of the circuit element;

first heat conduction means, interposed between the heat sink and the circuit element, for conducting the heat of the circuit element to the heat sink; and second heat conduction means, interposed between the heat sink and the reinforcement plate of the input means, for transmitting the heat of the circuit element conducted to the heat sink to the reinforcement plate.

In the above structure, when the circuit element produces heat, the heat of the circuit element is conducted to the heat sink via the first heat conduction means and let to escape to the outside of the circuit board via the heat sink. Furthermore, the heat of the circuit element conducted to the heat sink is let to escape to the reinforcement plate of the input means via the second heat conduction means. Since the reinforcement plate is formed of heat-conductive metallic material, the heat is diffused over the entire reinforcement plate. In addition, since the reinforcement plate is located on the top end portion of the casing, the heat conducted to the reinforcement plate easily escapes to the outside of the casing. Therefore, the reinforcement plate of the input means can be effectively used as radiation plate, and the heat radiation performance of the circuit element is further enhanced.

In order to achieve the second object, there is provided a portable electronic apparatus comprising:

a box-shaped casing having an upper wall in which a mounting hole is formed;

input means for inputting information, said input means being disposed in said mounting hole in the casing, the input means having a lower surface exposed to the inside of the casing via the mounting hole, said lower surface being covered with a metallic reinforcement plate;

a circuit board contained within the casing;

a circuit element mounted on said circuit board and producing heat during operation; and heat conduction means, for transmitting the heat of the circuit element to the reinforcement plate.

In the above structure, when the circuit element produces heat, the heat of the circuit element is let to escape to the reinforcement plate of the input means via the heat conduction means. Since the reinforcement plate is formed of heat-conductive metallic material, the heat is diffused over the entire reinforcement plate. In addition, since the reinforcement plate is located on the top end portion of the casing, the heat conducted to the reinforcement plate easily escapes to the outside of the casing. Therefore, the reinforcement plate of the input means can be effectively used as radiation plate, and the heat radiation performance of the circuit element is further enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 35 show a first embodiment of the present invention, in which

FIG. 1 is a perspective view of a portable computer,

FIG. 2 is a perspective view of the portable computer, with a keyboard and an HDD removed from a casing.

FIG. 3 is a perspective view of a lower housing in which a first circuit board having a heat sink is mounted, FIG. 4 is a perspective view of the lower housing from which first to third circuit boards are separated, FIG. 5 is a perspective view of the lower housing in which the first to third circuit boards are mounted, FIG. 6 is a perspective view of a battery storing section, FIG. 7 is a cross-sectional view of the casing, showing a battery connector attachment section, FIG. 8 is a plan view of the casing, showing the battery connector attachment section, FIG. 9 is a front view of the portable computer, FIG. 10 is a rear view of the portable computer, FIG. 11 is a perspective view showing the state in which the HDD is inserted in a hard disk mounting section, FIG. 12 is a perspective view showing the state in which the HDD is mounted in the hard disk mounting section, FIG. 13 is a cross-sectional view of the casing, showing the positional relationship between the HDD mounted in the hard disk mounting section and the keyboard, FIG. 14 is a cross-sectional view of the HDD, FIG. 15 is a perspective view of the HDD to which a bracket is attached, FIG. 16 is a perspective view showing the bottom side of the housing of the HDD, FIG. 17 is a cross-sectional view of the portable computer, showing the state in which the HDD is inserted in the hard disk mounting section of the casing, FIG. 18 is a cross-sectional view of the portable computer, showing the state in which the HDD is fallen in the hard disk mounting section of the casing, FIG. 19 is a cross-sectional view of the portable computer, showing the state in, which the HDD is completely mounted in the hard disk mounting section of the casing, FIG. 20 is a cross-sectional view of the portable computer, showing a TCP, a heat radiation unit, and attachment sections of a heat sink and a sub-heat sink, FIG. 21A is a cross-sectional view of a TCP mounting section, FIG. 21B is an enlarged cross-sectional view of a portion 21B in FIG. 21A, FIG. 22 is a perspective view showing the positional relationship between the first circuit board and the TCP, heat radiation unit, heat sink and sub-heat sink, FIG. 23 is a perspective view showing the positional relationship between the first circuit board and the TCP, heat radiation unit, heat sink and sub-heat sink, FIG. 24 is a perspective view showing the state in which a cover having a thermistor is removed from the first circuit board, FIG. 25 is a cross-sectional view of the portable computer, showing attachment sections for the TCP, heat radiation unit, heat sink and sub-heat sink, FIG. 26 is a cross-sectional view of the portable computer, showing attachment sections for the heat sink, sub-heat sink and first heat radiation plate, FIG. 27 is a perspective view of the portable computer, showing the state in which a memory board and a bottom cover are removed from the casing, FIG. 29 is a cross-sectional view of the portable computer, showing the structure of attachment sections for the memory board and bottom cover, FIG. 30 is a perspective view of the portable computer, showing the state in which a holder is removed from an upper housing, FIG. 31 is a perspective view of the portable computer, showing the state in which an icon and a loudspeaker are built in the casing, FIG. 32 is a cross-sectional view of the portable computer, showing the structure of an attachment section for the icon, FIG. 33 is a cross-sectional view of the portable computer, showing the structure of an attachment section for the loudspeaker, FIG. 34 is a perspective view showing the state in which a buffer member is attached to the housing of a display unit, and FIG. 35 is a perspective view showing the state in which the buffer member is separated from the housing of the display unit;

DETAILED DESCRIPTION OF THE PREFERRED EMBODIMENTS

A first embodiment of the present invention, which is applied to a portable computer, will now be described with respect to FIGS. 1 to 35.

Figure 1:
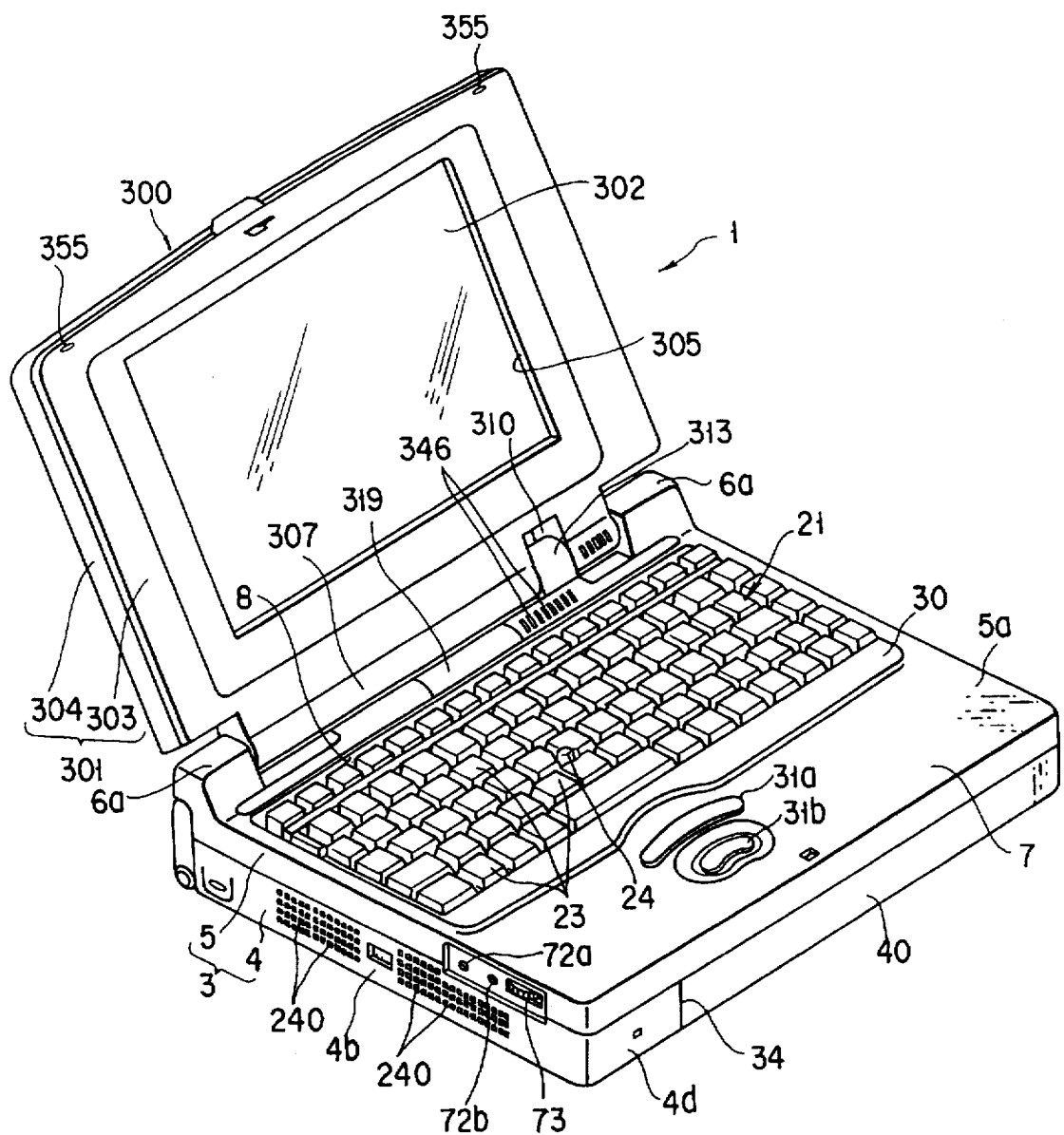

FIG. 1 shows a "B5" size notebook-type portable computer 1. The computer 1 has a casing 3 of a flat box shape. The casing 3 is divided into a lower housing 4 and an upper housing 5. The lower housing 4 and upper housing 5 are formed of a synthetic resin material such as ABS resin.

Figure 3:
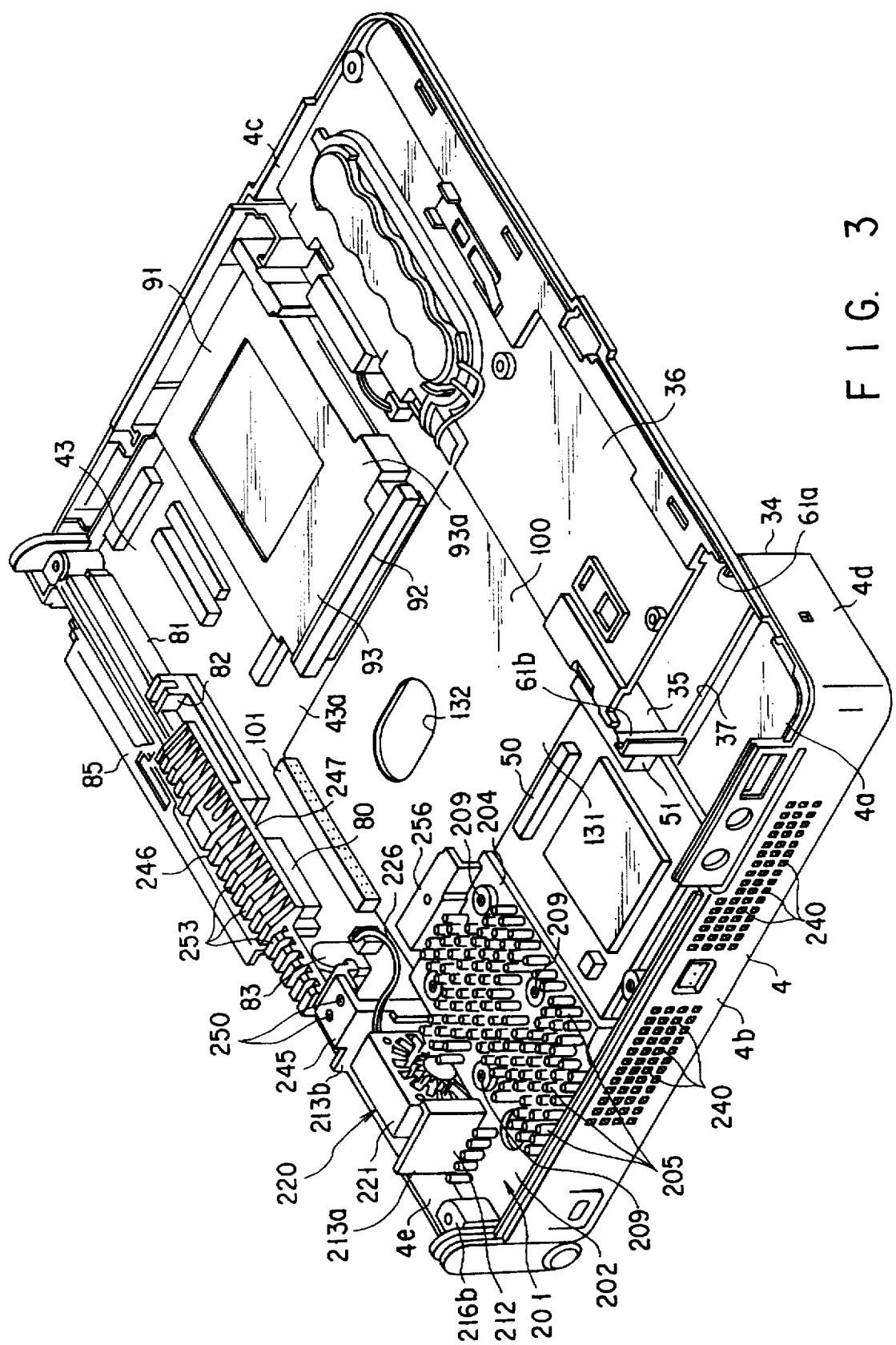

As is shown in FIGS. 3 and 7, the lower housing 4 comprises a flat bottom wall 4a, a pair of side walls 4b and 4c, a front wall 4d, and a rear wall 4e. The side walls 4b and 4c, front wall 4d and rear wall 4e extend upward from the peripheral portion of the bottom wall 4a.

Figure 2:
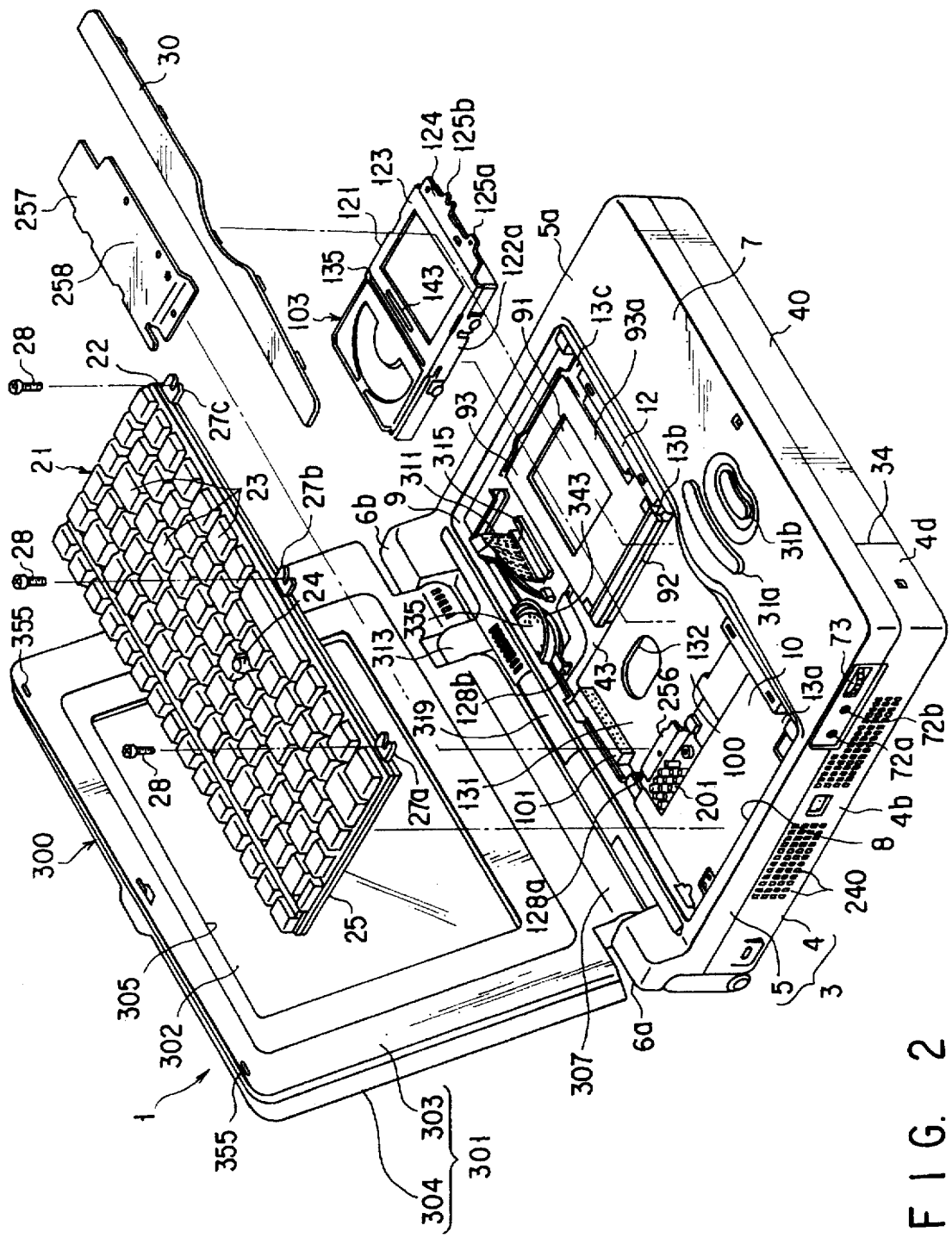

As is clear from FIG. 2, the upper housing 5 has a substantially flat plate shape and includes an upper wall 5a. The upper wall 5a is opposed to the bottom wall 4a. The peripheral portions of the upper wall 5a extend continuous with the side walls 4b and 4c, front wall 4d and rear wall 4d of the lower housing 4. The upper wall 5a includes a pair of display support portions 6a and 6b. The display support portions 6a and 6b are provided on a rear end portion of the upper wall 5a and located apart from each other in the width direction of the upper housing 5. The display support portions 6a and 6b project upward from the upper wall 5a.

Figure 12:
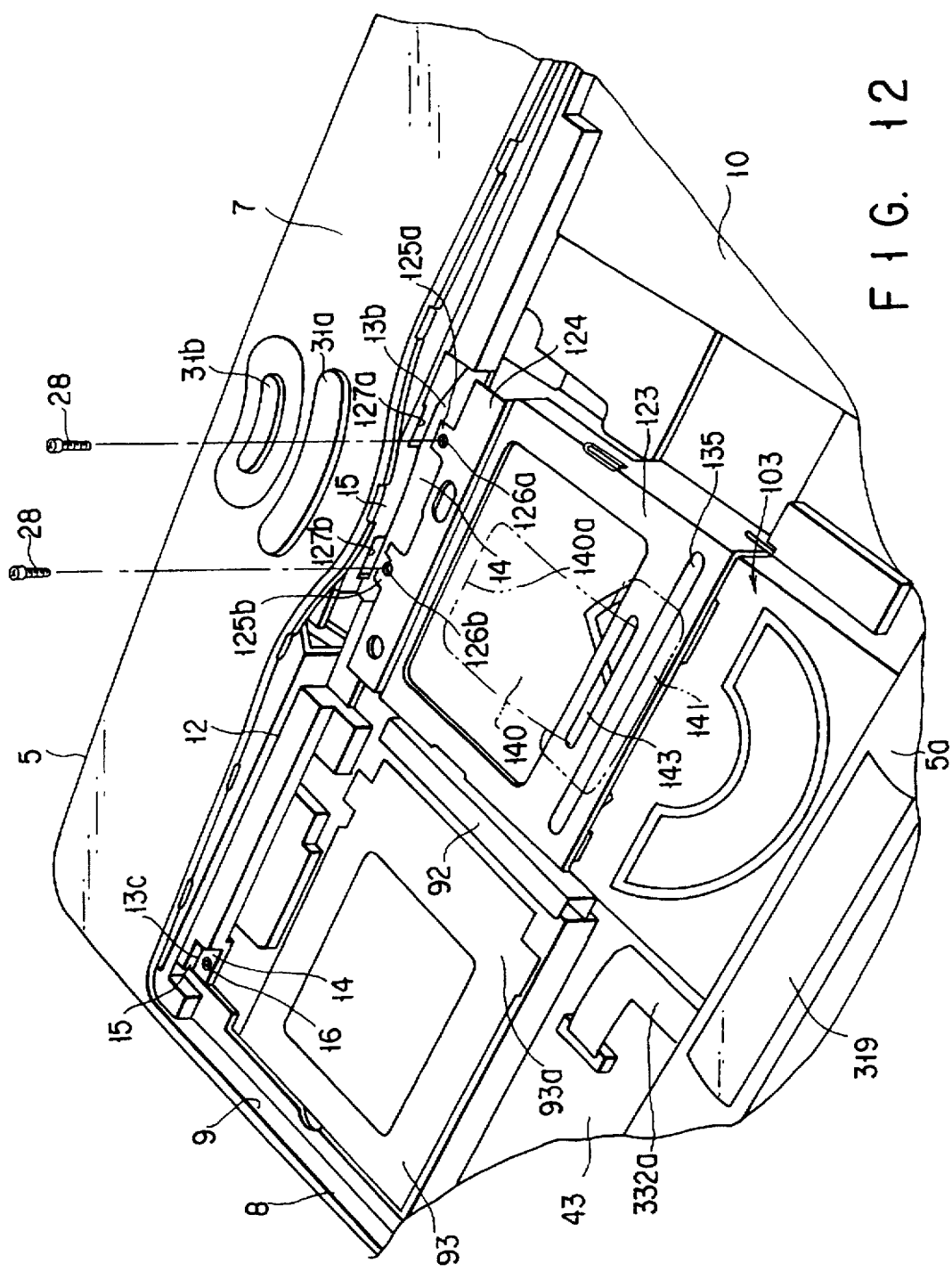

The upper wall 5a of the upper housing 5 comprises a front half portion and a rear half portion. The front half portion of the upper wall 5a serves also as an armrest 7. The rear half portion of the upper wall 5a is continuous with the armrest 7. A rectangular keyboard mounting hole 8 is formed in the rear half portion. As is shown in FIG. 2, the keyboard mounting hole 8 has such a size as to occupy substantially the entire area of the rear half portion of the upper wall 5a. The upper wall 5a, as shown in FIG. 12, includes a peripheral wall 9 extending downward from a rear edge and side edges of the keyboard mounting hole 8. Furthermore, the upper wall 5a includes a support wall 10. The support wall 10 extends continuous with a lower end portion of the peripheral wall 9 and is located on the left-hand side of the keyboard mounting hole 8 within the keyboard mounting hole 8. The support wall 10 is substantially parallel to the bottom wall 4a of the lower housing 4.

As is shown in FIGS. 2 and 12, a keyboard support portion 12 is formed on a front edge of the keyboard mounting hole 8. The keyboard support portion 12 extends in the width direction of the upper housing 5 along the front edge of the keyboard mounting hole 8. The keyboard support portion 12 includes first to third receiving recess portions 13a to 13c. The receiving recess portions 13a to 13c are arranged apart from one another in the width direction of the upper housing 5. The first receiving recess portion 13a and third receiving recess portion 13c are located at both end portions of the keyboard support portion 12 in its longitudinal direction, and the second receiving recess portion 13b is located at a middle portion of the keyboard support portion 12 in its longitudinal direction. The width of the second receiving recess portion 13b is greater than that of each of the first and third receiving recess portions 13a and 13c. As is shown in FIGS. 12 and 17, each of the first to third receiving recess portions 13a to 13c includes a flat upper surface 14 and an upright surface 15 extending upward from a front end of the upper surface 14. The upper surface 14 is substantially flush with the support wall 10 in the keyboard mounting hole 8. A nut 16 is buried in the upper surface 14 of each of the receiving recess portions 13a to 13c.

As is shown in FIG. 2, a keyboard 21 serving as information input means is detachably mounted in the keyboard mounting hole 8. The keyboard 21 comprises a keyboard panel 22 of synthetic resin, a number of keys 23 arranged on the upper surface of the keyboard panel 22, and a joystick 24 or a kind of pointing device disposed on the upper surface of the keyboard panel 22. The keyboard panel 22 has a flat rectangular shape and has such a size as to permit engagement in the keyboard mounting hole 8. A metallic reinforcement plate 25 is attached to the lower surface of the keyboard panel 22. The reinforcement plate 25 reinforces the keyboard panel 22 and prevents switching noise caused by the key operations from leaking into the inside of the casing 3. The reinforcement panel 25 is formed of an aluminum alloy with excellent heat conductivity and has a flat rectangular shape with such a size as to cover the entire lower surface of the keyboard panel 22.

The keyboard panel 22 has first to third support portions 27a to 27c. The support portions 27a to 27c extend forward from the front edge of the keyboard panel 22. When the keyboard 21 is mounted in the keyboard mounting hole 8, the support portions 27a to 27c superposed on the upper surfaces 14 of the first to third receiving recess portions 13a to 13c. The keyboard 21 is fixed in the keyboard mounting hole 8 by inserting, from above, screws 28 into the support portions 27a to 27c and engaging the screws 28 with the nuts 16. In the state in which the keyboard 21 is fixed in the keyboard mounting hole 8, the left-hand portion of the reinforcement plate 25 is superposed on the upper surface of the support wall 10 and the other portion of the reinforcement plate 25 is exposed to the inside of the casing 3.

A decorative panel 30 is detachably fitted on the front end of the keyboard mounting hole 8, as shown in FIG. 2. The decorative panel 30 serves to cover the fixing portion between the keyboard support portion 12 and the keyboard 21. The panel 30 is situated between the armrest 7 and the keys 23 of the foremost row of the keyboard 21. A pair of click switch buttons 31a and 31b are arranged on a substantially central portion of the armrest 7. The click switch buttons 31a and 31b are depressed by the finger to execute or cancel commands. The click switch buttons 31a and 31b project slightly from the upper surface of the armrest 7.

As is shown in FIGS. 3 and 6, the casing 3 has a battery storing section 34. The battery storing section 34 is defined by an opening recess continuous with the bottom wall 4a, front wall 4d and right-hand side wall 4c of the lower housing 4. The battery storing section 34 extends in the width direction of the casing 3 under the armrest 7. The battery storing section 34 includes an upright wall 35 extending upward from the bottom wall 4a of the lower housing 4 and a ceiling wall 36 continuous with an upper end of the upright wall 35. The ceiling wall 36 is situated horizontal and opposed to the armrest 7. The upright wall 35 and ceiling wall 36 partition the battery storing section 34 from the inside of the casing 3. A connector lead-out hole 37 communicating with the inside of the casing 3 is opened at the left-hand portion of the battery storing section 34.

A battery pack 40 is detachably mounted in the battery storing section 34. The battery pack 40 functions as a driving power source of the computer 1 when the computer 1 is used in a place where commercial power is not available. The battery pack 40 has an outer peripheral surface which is continuous with the bottom wall 4a, front wall 4d and right-hand side wall 4c of the lower housing 4 when the battery pack 40 is mounted in the battery storing section 34.

Figure 4:
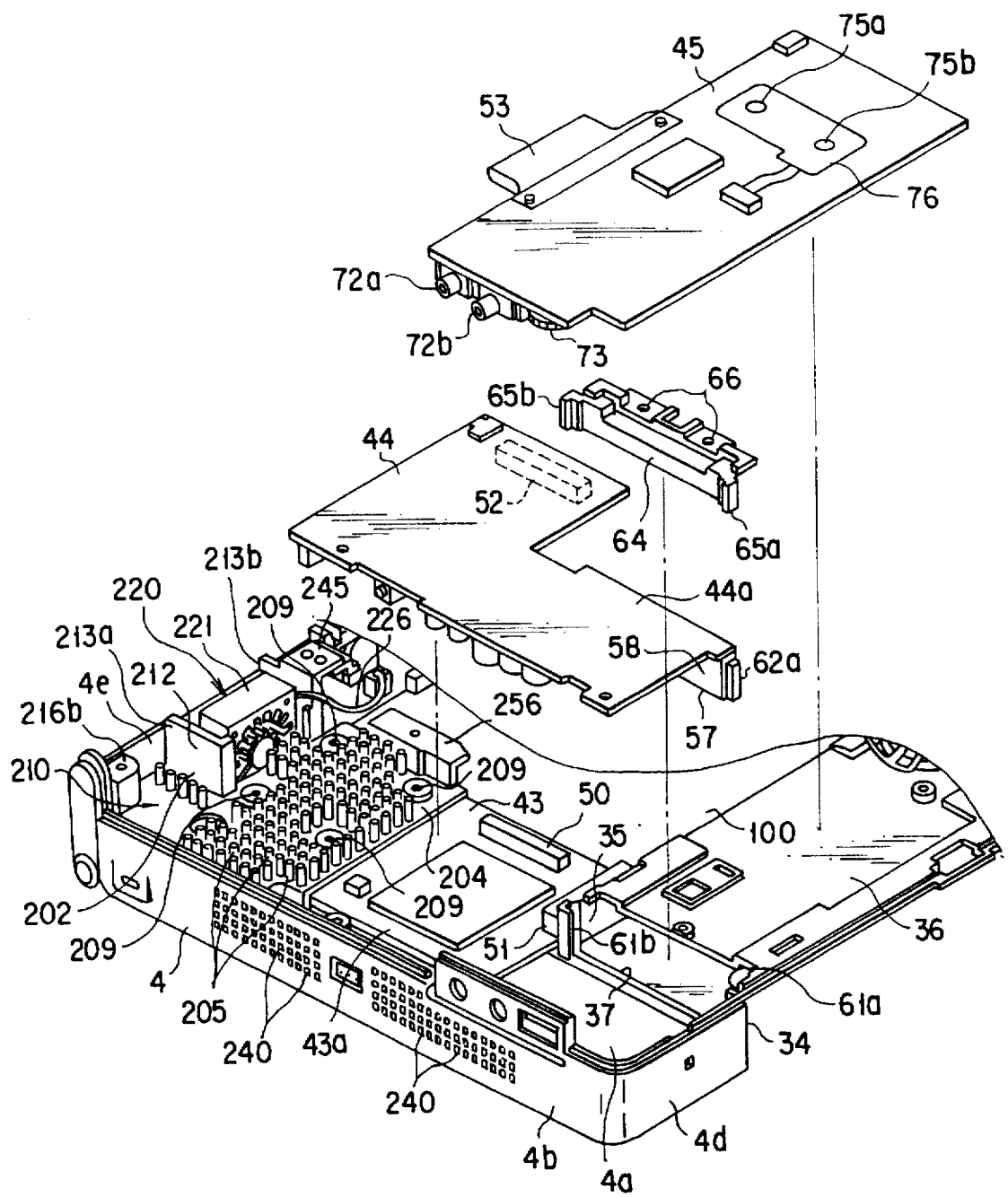
Figure 5:
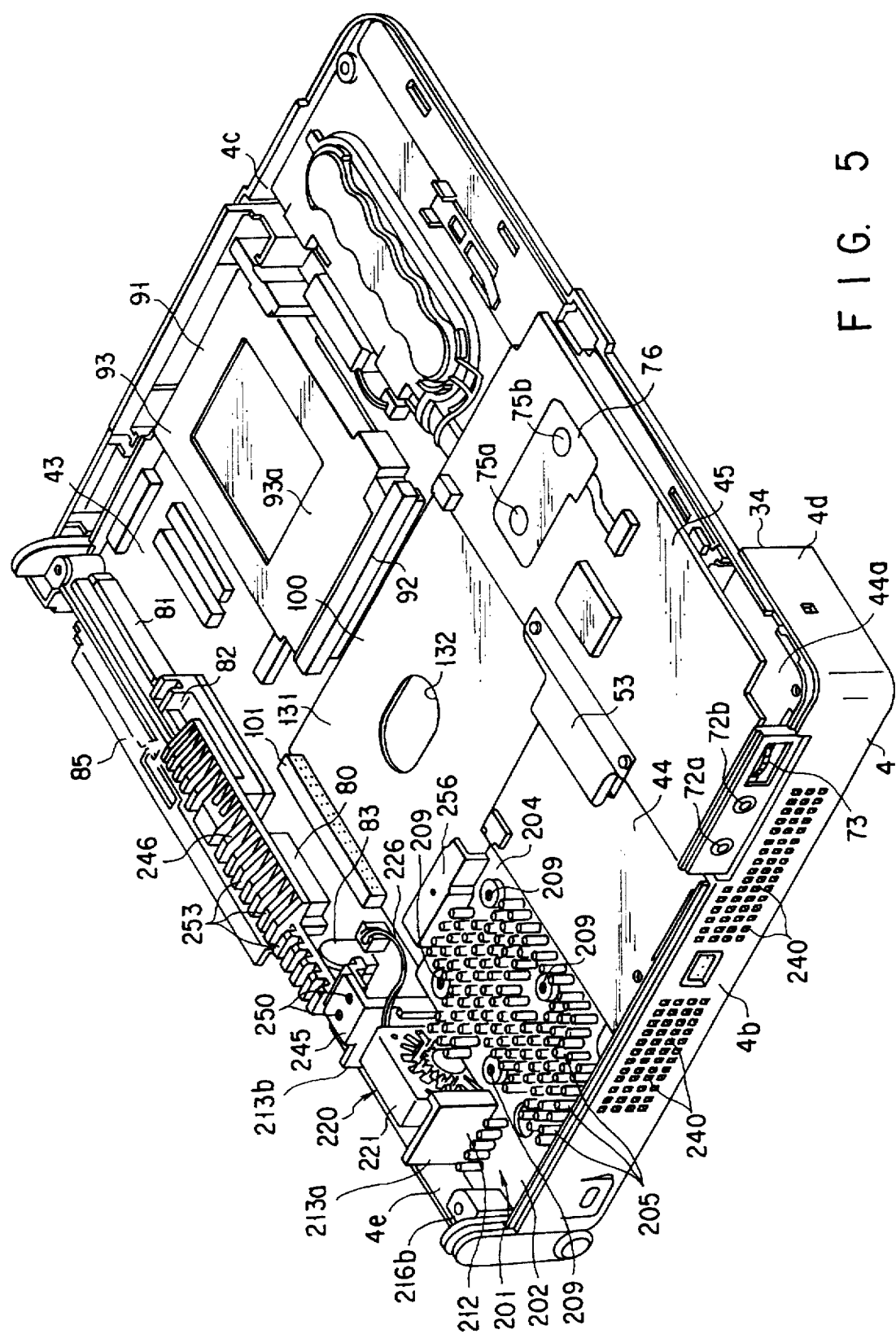
Figure 19:
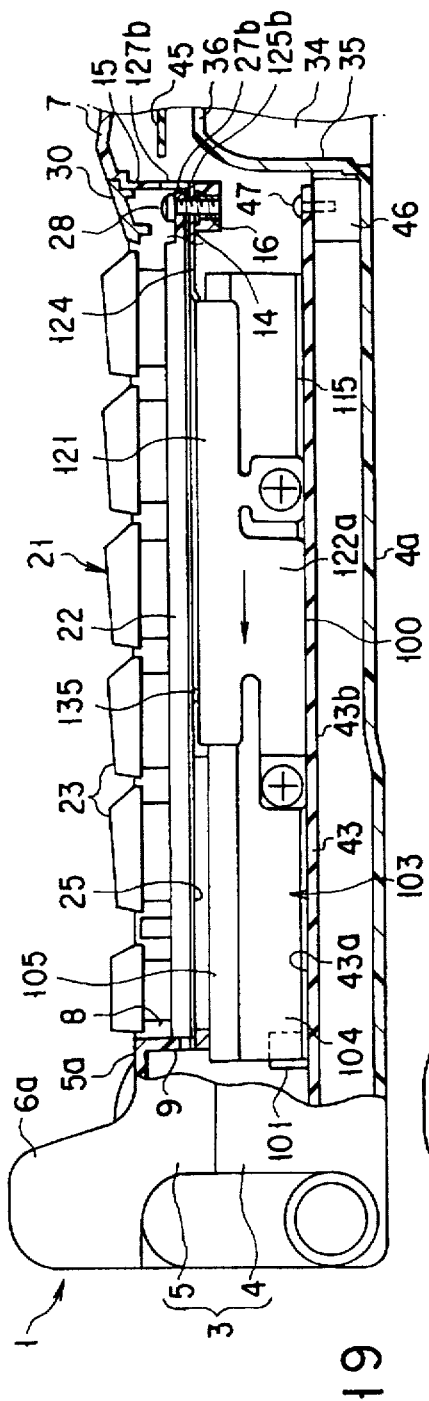
Figure 26:
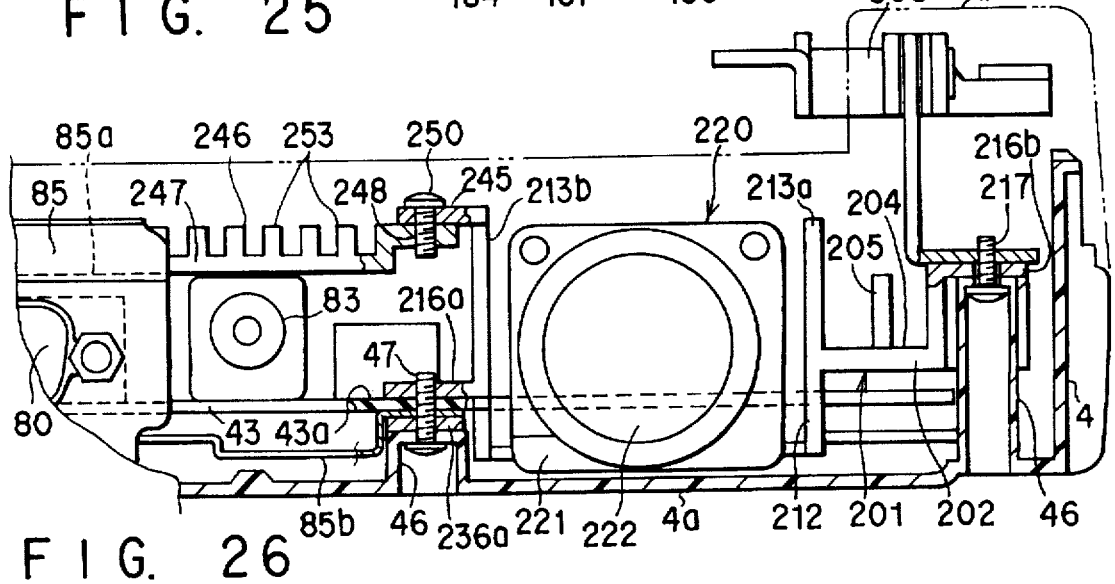

As is shown in FIGS. 4 and 5, first to third circuit boards 43 to 45 are contained within the lower housing 4. The first circuit board 43 has a bottom surface 43b or a first surface and a top surface 43a or a second surface. The first circuit board 43 is fixed on a plurality of boss portions 46 provided on the bottom wall 4a of the lower housing 4 by means of screws 47, as shown in FIGS. 19 and 26. Thus, the first circuit board 43 is contained within the lower housing 4 in parallel to the bottom wall 4a. The first circuit board 43 is situated below the keyboard 21. A first stacking connector 50 and a second stacking connector 51 are arranged on a left-hand portion of the top surface 43a of the circuit board 43.

The second circuit board 44 is situated substantially in parallel to the first circuit board 43 above a left-hand end portion of the first circuit board 43. The second circuit board 44 has an extended portion 44a. The extended portion 44a is interposed between the connector lead-out hole 37 of the battery storing section 34 and the left-hand sidewall 4b of the lower housing 4. The second circuit board 44 has a portion opposed to the first circuit board 43, below which portion a third stacking connector 52 is situated. The first stacking connector 50 and third stacking connector 52 extend in the depth direction of the lower housing 4. These stacking connectors 50 and 52 are coupled to each other, thereby electrically connecting the first and second circuit boards 43 and 44.

Figure 28A:
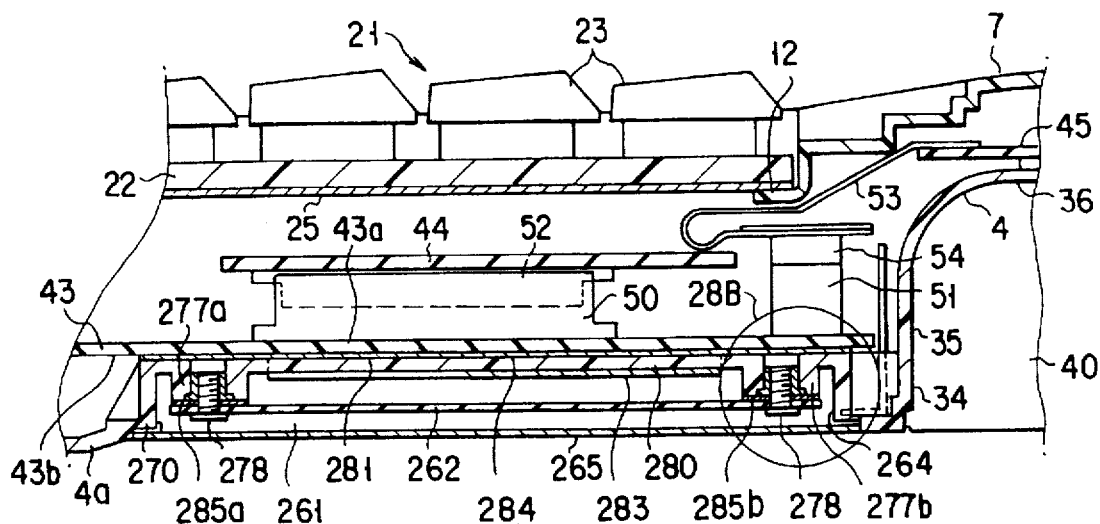
FIG. 28A is a cross-sectional view of the portable computer, showing the structure of attachment sections for the memory board and bottom cover in relation to the lower housing.

The third circuit board 45 is situated substantially in parallel to the second circuit board 44 above the second circuit board 44. The third circuit board 45 extends in the width direction of the casing 3 along the armrest 7. The third circuit board 45 is interposed between the armrest 7 and the ceiling wall 35 of the battery storing section 34. The third circuit board 45 is fixed on the upper surface of the ceiling wall 35 by means of screws. A fourth stacking connector 54 is connected to the third circuit board 45 via a flexible wiring board 53, as shown in FIG. 28A. The fourth stacking connector 45 is engaged with the second stacking connector 51, thereby electrically connecting the first and third circuit boards 43 and 45.

As is shown in FIG. 4, a battery connector 57 is attached to the extended portion 44a of the second circuit board 44. The battery connector 57 comprises a connector body 58 and a plurality of connection terminals 59 supported on the connector body 58. The connector body 58 has an elongated rectangular shape, and is attached to the bottom surface of the extended portion 44a. The connection terminals 59 are exposed to the battery storing section 34 through the connector lead-out hole 37. The connection terminals 59 are to be connected to power terminals and signal terminals (not shown) of the battery pack 40.

As is shown in FIG. 8, the lower housing 4 is provided with a pair of engaging grooves 61a and 61b for positioning the battery connector 57. The engaging grooves 61a and 61b are located at edges of the connector lead-out hole 37. One of the engaging grooves, 61a, is formed in the inner surface of the front wall 4d of the lower housing 4 and extends in the height direction of the front wall 4d. The other engaging groove 61b is formed in the upright wall 35 of the battery storing section 34 and extends in the height direction of the upright wall 35. The engaging grooves 61a and 61b are opposed to each other in the depth direction of the casing 3.

The connector body 58 has a pair of engaging projections 62a and 62b. The engaging projections 62a and 62b extend in the height direction of the connector body 58 on both sides of the connector body 58 in its longitudinal direction. When the second circuit board 44 is contained in the lower housing 4, the engaging projections 62a and 62b are engaged in the engaging grooves 61a and 61b from above. By the engagement, the battery connector 57 is held in the lower housing 4 while the connection terminals 59 are situated in the connector lead-out hole 37.

An inner cover 64 is attached to the battery storing section 34. The inner cover 64 closes the gap between the upper surface of the connector body 58 and the upper edge of the connector lead-out hole 37. The inner cover 64 has a pair of guide portions 65a and 65b and a support portion 66. The guide portions 65a and 65b are engaged in the engaging grooves 61a and 61b, thereby positioning the inner cover 64 and connector lead-out hole 37. The support portion 66 is superposed on the upper surface of the ceiling wall 36. The support portion 66 is clamped between the ceiling wall 36 and third circuit board 45. Thus, the inner cover 64 is held on the upper part of the connector lead-out hole 37.

As is shown in FIGS. 6 and 7, a lower corner portion defined by the front wall 4d and bottom wall 4a of the lower housing 4 is formed as an arcuated curved portion 69. The lower housing 4 is provided with the curved portion 69 because of design requirement of the computer 1. The curved portion 69 is located at a lower portion of one of the engaging grooves, 61a. The depth of the lower portion of the engaging groove 61a decreases gradually towards the lower end because of the presence of the curved portion 69. A lower corner portion 63 of the engaging projection 62a to be engaged in the engaging groove 61a has a square shape. Therefore, if the engaging projection 62a is engaged in the engaging groove 61a, the lower corner portion 63 of engaging projection 62a would abut on the inner face of the engaging groove 61a, and the engagement between the projection 62a and groove 61a would be prevented.

To solve this problem, the front wall 4d of the lower housing 4 is provided with a plurality of vent holes 70. The vent holes 70 are arranged at intervals in the width direction of the lower housing 4 at a position corresponding to the curved portion 69. The vent holes 70 communicate with the inside of the lower housing 4. As is shown in FIG. 7, one of the vent holes 70 opens at a position corresponding to the lower end of the engaging groove 61a. If the engaging projection 62a of the connector body 58 is engaged in the engaging groove 61a from above, the lower corner portion 63 of the engaging projection 62a enters the vent hole 70. Thus, the abutment between the projection 62a and the inner face of the groove 61a is avoided.

According to the structure of the lower housing 4, even if the lower corner portion of the lower housing 4 is curved arcuately, there is no need to cut the lower corner portion 63 of the connector body 58 or provide a custom-made connector body. As a result, the conventional battery connector 57 can be used as it is, and the common use of the part can be realized.

In the above first embodiment, the lower corner portion 63 of the engaging projection 62a is inserted in the vent hole 70, thereby avoiding abutment between the connector body 58 and the inner face of the engaging groove 61a. If the same problem occurs in connection with the end portion of the second circuit board 44 and curved portion 69, it is possible to provide the front wall 4d with a slit extending in the width direction of the lower housing 4 and insert the end portion of the second circuit board 44 in this slit.

As is shown in FIG. 4, a pair of jacks 72a and 72b, i.e. an audio input terminal and an audio output terminal, and a volume control dial 73 are arranged on a left-hand end portion of the third circuit board 45. The jacks 72a and 72b and dial 73 are exposed to the left-hand side wall 4b of the housing 4. In addition, a pair of click switches 75a and 75b are arranged on the surface of the third circuit board 45. The click switches 75a and 75b are depressed by the click switch buttons 31a and 31b and are connected to the third circuit board 45 via a soft wiring board 76.

As is shown in FIG. 3, a connection port 80, a parallel port 81, an extension port 82 and a power supply connector 83 are arranged on a rear end portion of the top surface 43a of the first circuit board 43 in a row in the width direction of the lower housing 4. The connection port 80 is connected to a peripheral device having an interface of, e.g. RS232C standard. The parallel port 81 is connected to a printer. The extension connector 82 is connected to an extension station for extending the function of the computer 1. The power supply connector 83 is connected to a power supply plug which is in turn connected to a commercial power supply.

A metallic connector panel 85 is attached to the rear end portion of the first circuit board 43, as shown in FIG. 32, too. The connector panel 85 supports the connection port 80, parallel port 81 and extension port 82. The connector panel 85 extends upward from the first circuit board 43 and also extends in the width direction of the lower housing 4 along the rear wall 4e of the lower housing 4. An engaging portion 85a is formed at an upper part of the connector panel 85. The engaging portion 85a is located above the connector port 80 and extension connector 83. In addition, as is clear from FIG. 32, the connector panel 85 has an extended portion 85b situated between the first circuit board 43 and the bottom wall 4a of the lower housing 4. The extended portion 85b is situated substantially in parallel to the bottom wall 4a. An end portion of the extended portion 85b is supported on the boss portion 46 on the bottom wall 4a along with the first circuit board 43 (see FIG. 26).

As is shown in FIG. 10, the rear wall 4e of the lower housing 4 is provided with a first connector lead-out hole 86 for exposing the connection port 80, parallel port 81 and extension connector 82, and a second connector lead-out hole 87 for exposing the power supply connector 83. The lower housing 4 has a connector cover 88. The connector cover 88 is supported on the lower housing 4 such that it can be shifted between a first position to open the first connector lead-out hole 86 and a second position to close the first connector leads out hole 86. In the first position, the connector cover 88 is stored between the bottom wall 4a of the lower housing 4 and the extended portion 85b of the connector panel 85.

As is shown in FIG. 3, a card storing section 91 is disposed on the top surface 43a of the first circuit board 43. The card storing section 91 is located on the right-hand end portion of the first circuit board 43a and on the rear side of the battery storing section 34. The card storing section 91 removably stores an extension card (not shown) such as a PCMCIA (Personal Computer Memory Card, International Association) card or an interface card. The card storing section 91 comprises a card connector 92 to be connected to the extension card, and a card case 93 having a guide for guiding the extension card to the card connector 92. The card case 93 is formed of a metallic material such as stainless steel. The card case 93 has a flat upper surface 93a. As is shown in FIG. 2, the upper surface 93a is located on the right-hand end portion of the keyboard mounting hole 8. The upper surface 93a of the card case 93 is substantially flush with the support wall 10 and the upper surface 14 of the keyboard support portion 12 within the keyboard mounting hole 8.

As is shown in FIGS. 3, 5 and 17, a hard disk mounting section 100 is provided in the top surface 43a of the first circuit board 43. The hard disk mounting section 100 is surrounded by the card storing section 91, second circuit board 44 and battery storing section 34 and is situated at a substantially central region of the first circuit board 43. The hard disk mounting section 100 has a hard disk connector 101. The hard disk connector 101 is situated on a rear end portion of the first circuit board 43 and is opposed to the upright wall 35 of the battery storing section 34. The hard disk mounting section 100 is situated below a substantially central portion of the keyboard mounting hole 8. Thus, as shown in FIG. 2, the hard disk mounting section 100 is exposed to the outside of the casing 3, if the keyboard 21 and decorative panel 30 are removed from the keyboard mounting hole 8.

A hard disk drive (HDD) 103 is removably stored in the hard disk mounting section 100. The HDD 103 is mounted in and removed from the hard disk mounting section 100 through the keyboard mounting hole 8. FIG. 14 shows the details of the HDD 103. The HDD 103 has a metallic housing 104. The housing 104 has a flat rectangular box shape with an opened top portion. The opened top portion of the housing 104 is air-lightly sealed by a top cover 105. The housing 104 has a bottom wall 104a with a motor mounting hole 106. The bottom wall 104a is opposed to the top cover 105. A motor bracket 107 is attached to the motor mounting hole 106 in the bottom wall 104a. The motor bracket 107 has a body 108 to be engaged in the motor mounting hole 106. The body 108 has a flat bottom surface 108a projecting downward from the bottom wall 104a.

A motor 110 is housed within the housing 104. The motor 110 has a shaft 111 supported by the body 108 of the motor bracket 107. A boss portion 112a of a rotor 112 is rotatably supported around the outer periphery of the shaft 111. A disk-shaped magnetic recording medium 113 is supported around the outer periphery of the rotor 112. A carriage with a magnetic head (not shown) and a voice coil motor for rotating the carriage are contained in the housing 104.

A circuit board 115 is supported on the bottom wall 104a of the housing 104. The circuit board 115 has a rectangular shape with substantially the same size as the bottom wall 104a of the housing 104. The circuit board 115 is situated substantially in parallel to the bottom wall 104a of the housing 104. The circuit board 115 is electrically connected to the motor 110, magnetic head and voice coil motor. A relay connector 116 is attached to the circuit board 115. The relay connector 116 is situated at one end portion of the housing 104. The relay connector 116 is detachably connected to the hard disk connector 101. The circuit board 115 has an opening 117 at a location opposed to the body 108 of the motor bracket 107. The opening 117 prevents interference between the circuit board 115 and body 108. Thus, the bottom surface 108a of the body 108 passes through the opening 117 and projects slightly downward from the circuit board 115.

Figure 11:
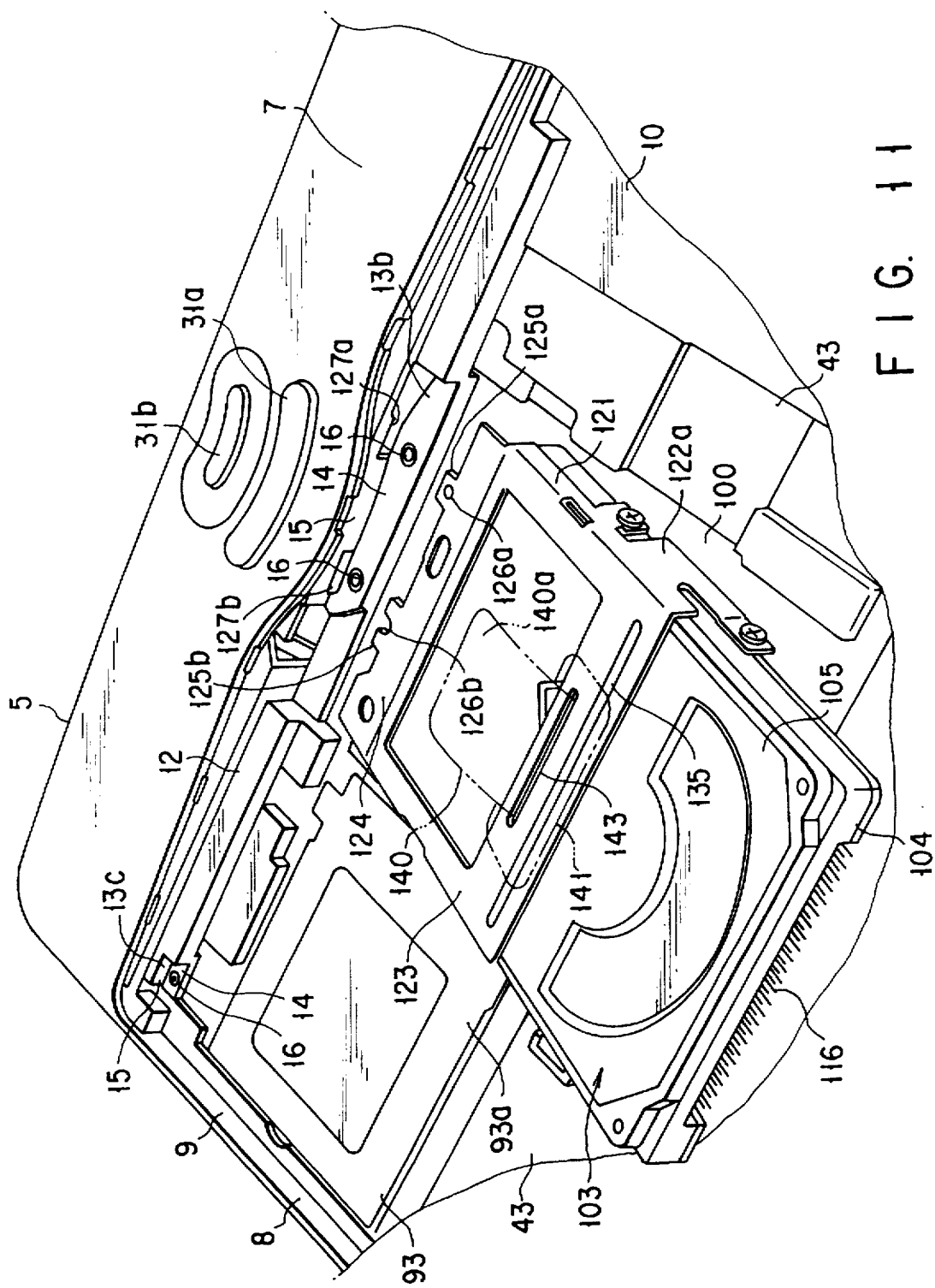
Figure 15:
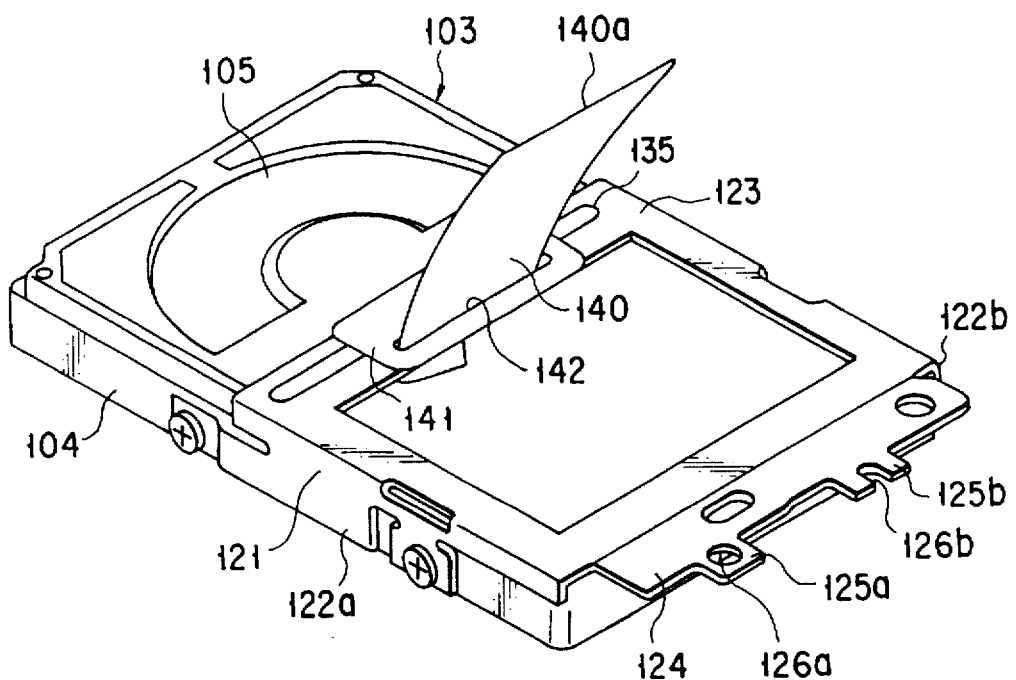
Figure 16:
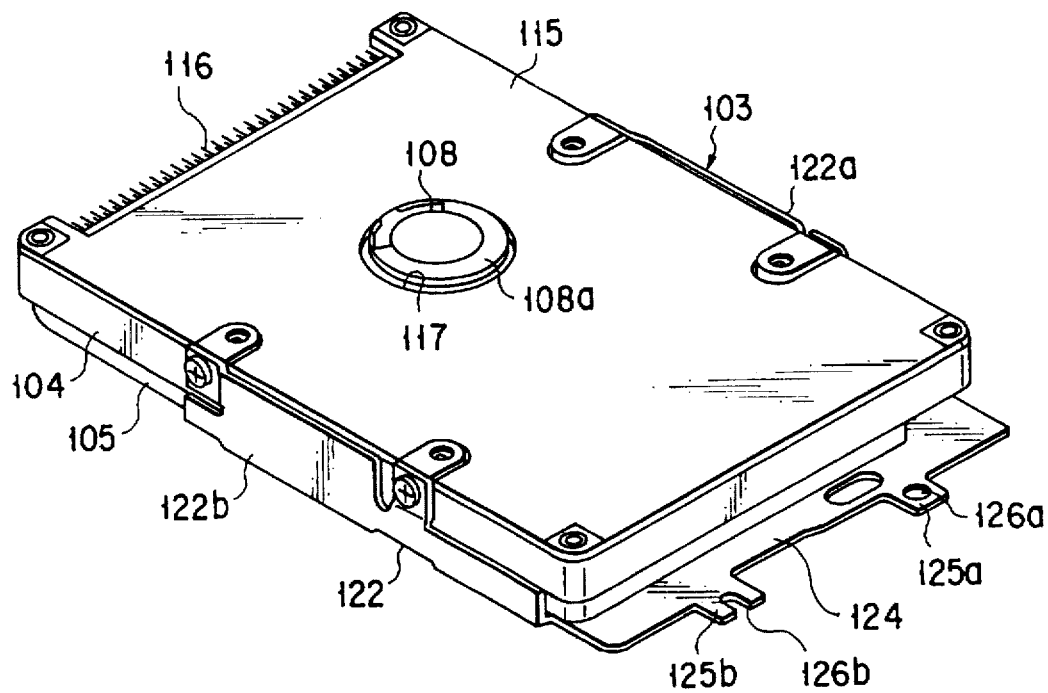

As is shown in FIGS. 15 and 16, a sheet-metal bracket 121 is attached to the housing 104 of the HDD 103. The bracket 121 comprises a pair of side plate portions 122a and 122b attached to the housing 104 by means of screws and a top plate portion 123 connecting the side plate portions 122a and 122b. The top plate portion 123 is superposed on the upper surface of the top cover 105. The top plate portion 123 includes an extended portion 124, which is situated on a side opposite to the relay connector 116. The extended portion 124 projects substantially horizontally from an end portion of the housing 104. A pair of tongue portions 125a and 125b are integrally formed on a distal end portion of the extended portion 124. The tongue portions 125a and 125b have insertion holes 126a and 126b through which screws 28 pass. When the HDD 103 is mounted in the hard disk mounting section 100, the tongue portions 125a and 125b are superposed on the upper surface 14 of the second receiving recess portion 13b of the keyboard support portion 12. Escape holes 127a and 127b in which the tongue portions 125a and 125b can enter are formed in the upright surface 15 of the second receiving recess portion 13b, which is continuous with the upper surface 14, as shown in FIGS. 11 and 17.

As is shown in FIG. 2, the peripheral wall 9 continuous with the rear edge of the keyboard mounting hole 8 has a pair of guide walls 128a and 128b. The guide walls 128a and 128b function to position the hard disk connector 101 and HDD 103 and are situated apart from each other in the width direction of the casing 3. The guide walls 128a and 128b extend downward from the peripheral wall 9 towards the hard disk mounting section 100. The HDD 103 is interposed between the guide walls 128a and 128b.

The procedure for mounting the HDD 103 in the hard disk mounting section 100 will now be described. At first, the decorative panel 30 is removed from the casing 3, and the fixing portion between the keyboard support portion 12 of the casing 3 and the keyboard 21 is exposed. Subsequently, the screws 28 are loosened and the keyboard 21 is unfixed. The keyboard 21 is removed from the casing 3 and the hard disk mounting section 100 is exposed upward through the keyboard mounting hole 8. Then, as shown in FIGS. 11 and 17, the HDD 103 is inserted into the hard disk mounting section 100 through the keyboard mounting hole 8 from the upper side of the casing 3. In this case, the HDD 103 is gradually inserted into the hard disk mounting section 100 in a downwardly inclined position, with the tongue portions 125a and 125b inserted at first. The tongue portions 125a and 125b are inserted into the escape holes 127a and 127b in the second receiving recess portion 13b. Thus, the distal end of the extended portion 124 of the bracket 121 is put in contact with a corner portion defined by the upper surface 14 and upright surface 15 of the second receiving recess portion 13b.

Then, the HDD 103 is rotated downward, as indicated by an arrow in FIG. 17, with the contact point between the distal end of the extended portion 124 and the second receiving recess portion 13b set as a fulcrum. Thereby, the HDD 103 is guided into the hard disk mounting section 100 through the space between the guide walls 128a and 128b and placed on the top surface 43a of the first circuit board 43. As a result, as shown in FIG. 18, the relay connector 116 of the HDD 103 faces the hard disk connector 101, and the extended portion 124 of the bracket 121 is superposed on the upper surface 14 of the second receiving recess portion 13b.

Subsequently, the HDD 103 is slid rearward in the casing 3, as indicated by an arrow in FIG. 19, so that the relay connector 116 is engaged with the hard disk connector 101. By the sliding motion, the tongue portions 125a and 125b are pulled out of the escape holes 127a and 127b and shifted onto the upper surface 14 of the second receiving recess portion 13b. Thus, the insertion holes 126a and 126b in the tongue portions 125a and 125b coincide with the nuts 16. Finally, the screws 28 are passed through the insertion holes 126a and 126b in the tongue portions 125a and 125b and fastened into the nuts 16. Thus, the HDD 103 is fixed in the hard disk mounting section 100 and the procedure for mounting the HDD 103 is completed. In this case, the screw 28 for fixing one of the tongue portions, 125b, passes through the second support portion 27b of the keyboard 21 and functions also as means for fixing the keyboard 21 to the keyboard support portion 12.

According to the above attachment structure of the HDD 103, when the HDD 103 is inserted into the hard disk mounting section 100, the tongue portions 125a and 125b, which are indispensable in fixing the HDD 103 to the hard disk mounting section 100, enter the escape holes 127a and 127b of the second receiving recess portion 13b of the casing 3 and are temporarily located outside the hard disk mounting section 100. When the HDD 103 inserted in the hard disk mounting section 100 is slid rearward, the tongue portions 125a and 125b are pulled out of the escape holes 127a and 127b and superposed on the upper surface 14 of the second receiving recess 13b. Thus, there is no need to provide a special space for permitting motion of the tongue portions 125a and 125b inside the hard disk mounting section 100. As a result, it is possible to prevent a useless space from being provided within the casing 3, and to achieve high-density mounting of parts.

As shown in FIG. 14, the top surface 43a of the first circuit board 43, which is open to the hard disk mounting section 100, is covered with a flat insulating sheet 131. The insulating sheet 131 prevents contact between the circuit board 115 of the HDD 103 and the first circuit board 43. The circuit board 115 of the HDD 103 is put in slidable contact with the insulating sheet 131. The body 108 of the motor bracket 107 of the HDD 103 projects slightly downward from the circuit board 115, as mentioned above. Thus, the insulating sheet 131 has an escape hole 132 for avoiding the body 108. The escape hole 132 has an oval shape elongated in the direction of sliding motion of the HDD 103 and has a size greater than the size of the body 108.

According to this structure, the insulating sheet 131, with which the circuit board 115 of the HDD 103 is put in slidable contact, has the escape hole 132 for avoiding interference with the body 108 of the HDD 103. Thus, when the HDD 103 is slid rearward in the direction of the hard disk connector 101, the bottom surface 108a of the body 108 is not caught on the insulating sheet 131. Accordingly, the HDD 103 can be slid smoothly and the insulating sheet 131 is not damaged.

In the above embodiment, the escape hole 132 has the oval shape. However, needless to say, it may have a circular shape or a rectangular shape.

As shown in FIG. 12, when the HDD 103 is fixed in the hard disk mounting section 100, the top plate portion 123 of the bracket 121 is located between the support wall 10 in the keyboard mounting hole 8 and the upper surface 93a of the card case 93. A projection 135 extending in the width direction of the casing 3 is formed integral with the top plate portion 123. The projection 135 bulges on the top plate portion 123 in an arcuated shape, as is clear from FIG. 17. The top portion of the projection 135 is substantially flush with the upper surface 93a of the card case 93 and the upper surface of the support wall 10. In the state in which the keyboard 21 is attached to the keyboard mounting hole 8, the lower surface of the reinforcement plate 25 of the keyboard 21 is in contact with the projection 135 of the bracket 121 and the upper surface 93a of the card case 93. Accordingly, the keyboard 21 can be supported from the lower side by making use of the card case 93 and the bracket 121 of the HDD 103. Thus, clattering of the keyboard 21 or bending of the keyboard panel 22 can be prevented when the keys 23 are operated.

As is shown in FIGS. 12 and 15, a ribbon 140 is attached to the top plate portion 123 of the bracket 121. The ribbon 140 is used when the HDD 103 is removed from the hard disk mounting section 100. The ribbon 140 is formed of a synthetic resin sheet in a strip shape with a width of about 30 mm. The ribbon 140 has such a degree of rigidity as to keep a straight shape. An end portion of the ribbon 140 is provided with an engaging portion 141. The engaging portion 141 is bent at right angles from the end portion of the ribbon 140. The engaging portion 141 has a rectangular shape with a greater width than the ribbon 140. The engaging portion 141 is superposed on the upper surface of the top plate portion 123. The engaging portion 141 has an insertion slit 142 through which the ribbon 140 can be passed. The top plate portion 123 has an attachment slit 143 through which the ribbon 140 can be passed. The attachment slit 143 faces the insertion slit 142.

The procedure for attaching the ribbon 140 to the top plate portion 123 will now be described. At first, the engaging portion 141 is superposed on the upper surface of the top plate portion 123, and the insertion slit 142 is opposed to the attachment slit 143. Then, a distal end portion 140a of the ribbon 140, which is located opposite to the engaging portion 141, is passed under the top plate portion 123 and led to the opening of the attachment slit 143. The distal end portion 140a is passed through the attachment slit 143 from under the top plate portion 123. Subsequently, the distal end portion 140a of the ribbon 140 is passed through the insertion slit 142 from under the engaging portion 141, and the distal end portion 140a is pulled up. Thus, as shown in FIG. 15, the engaging portion 141 is superposed on the upper surface of the top plate portion 123, the end portion of the ribbon 140 continuous with the engaging portion 141 is wound around the top plate portion 123, and the ribbon 140 is fixed on the top plate portion 123.

As is shown in FIG. 12, by virtue of the rigidity of the ribbon 140 itself, the ribbon 140 fixed on the top plate portion 123 maintains such a shape that the ribbon 140 projects upward from the top plate portion 123 towards the keyboard mounting hole 8. Accordingly, if the distal end portion 140a of ribbon 140 is picked up by the fingers and pulled towards the arm rest 7, the HDD 103 can be slid to the front side of the casing 3 and the relay connector 116 is disengaged from the hard disk connector 101. If the ribbon 140 is pulled up after the engagement between the connectors 110 and 116 is released, the HDD 103 can be removed from the hard disk mounting section 100.

In the state in which the keyboard 21 is mounted in the keyboard mounting hole 8, the ribbon 140 is folded between the reinforcement plate 25 of the keyboard 21 and the HDD 103. Thus, the ribbon 140 does not prevent the mounting of the keyboard 21.

According to the above attachment structure of the ribbon 140, the ribbon 140 is passed through the insertion slit 142 from the attachment slit 143, and thus the ribbon 140 is fixed on the top plate portion 123 of the bracket 121. Therefore, the ribbon 140 can be fixed easily in a short time, as compared to the case where the ribbon 140 is fixed to the HDD 103 by means of an adhesive. Furthermore, if the ribbon 140 is damaged, the ribbon 140 can be easily changed by pulling it out of the attachment slit 143 and insertion slit 142.

Figure 20:
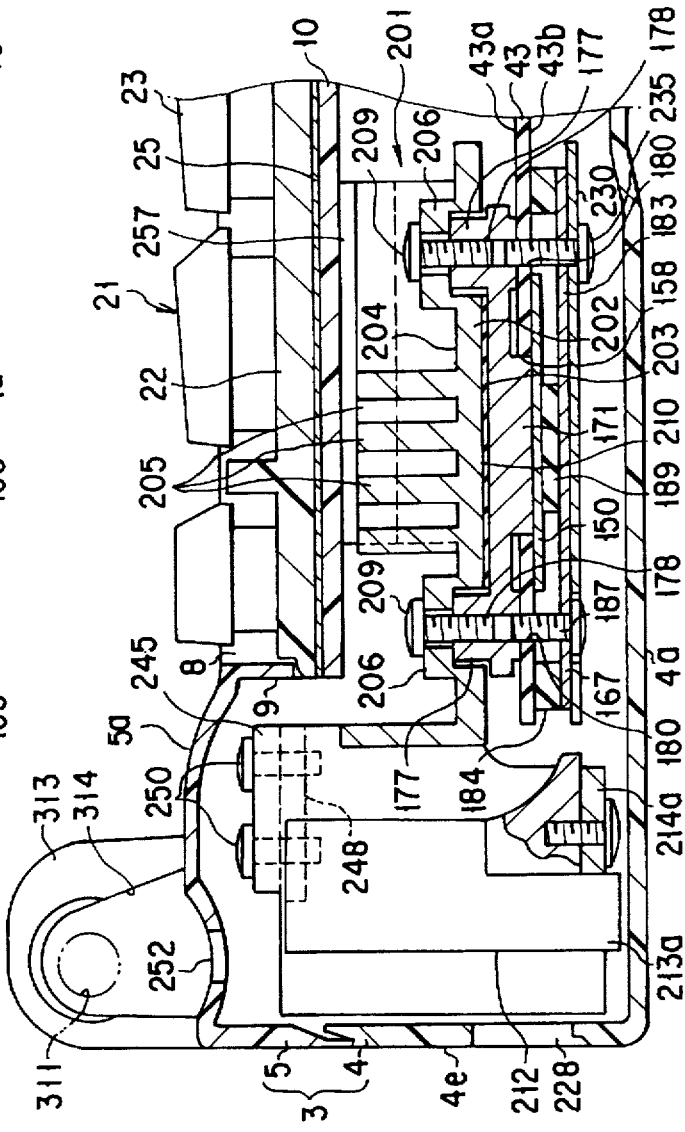
Figure 21:
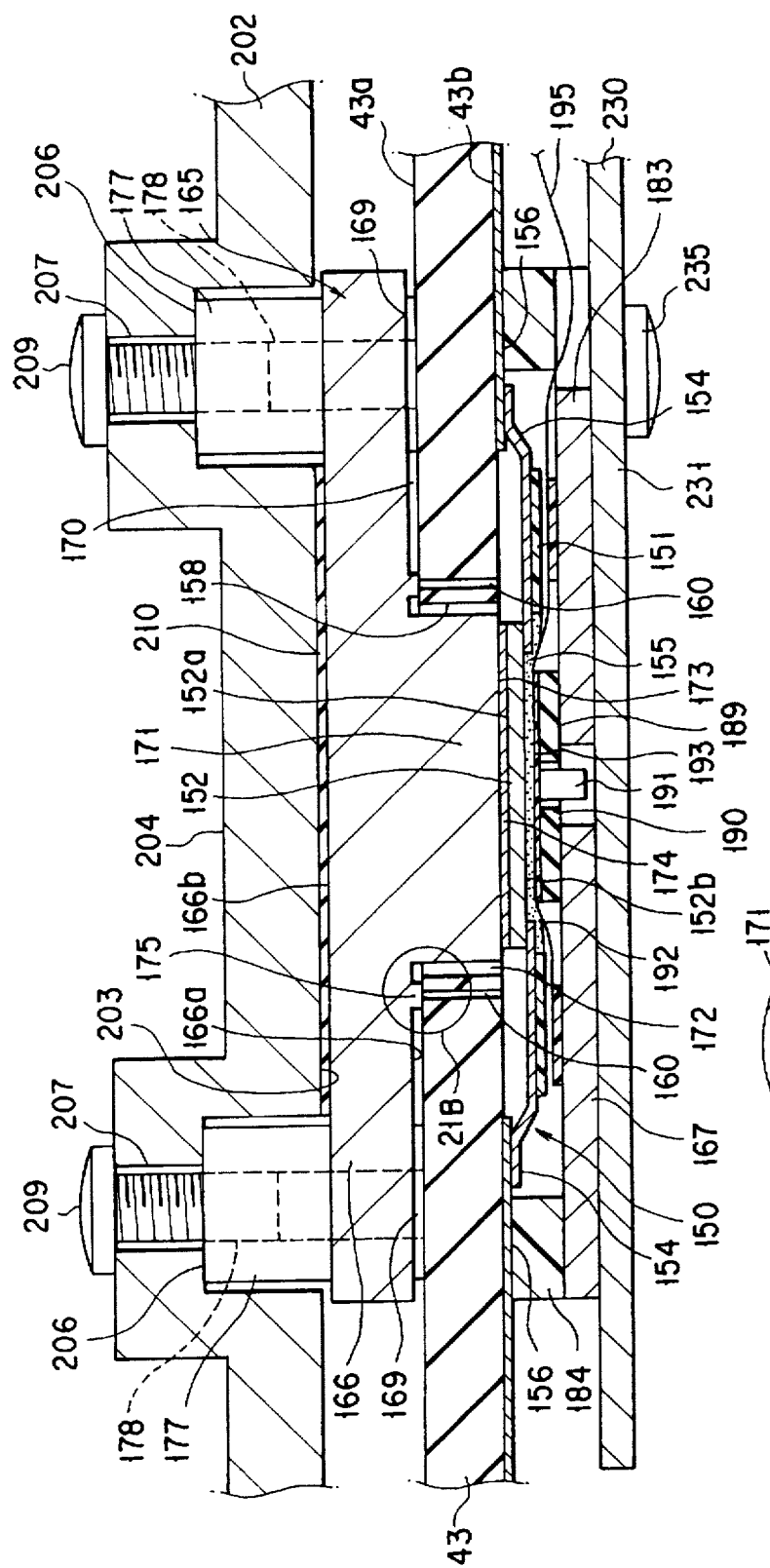
Figure 24:
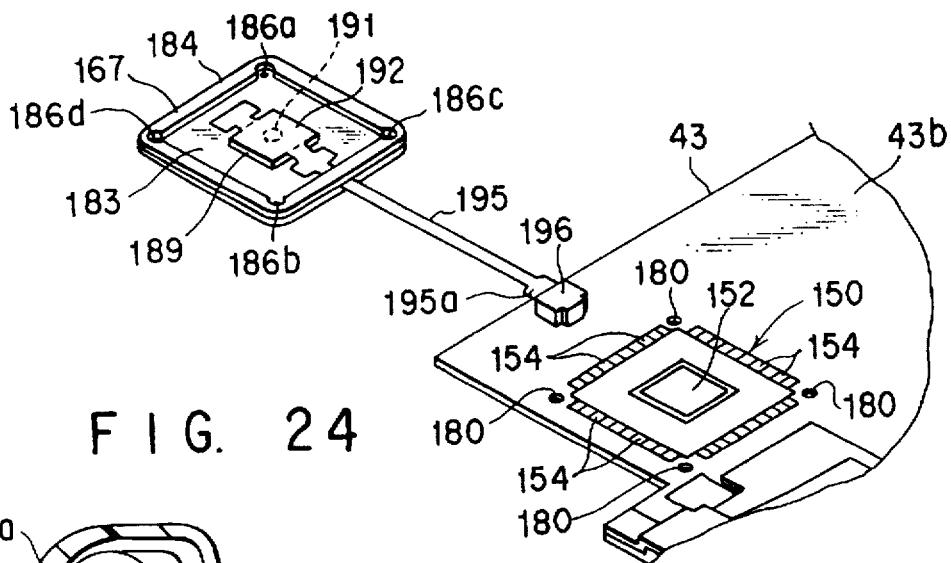

As is shown in FIGS. 20 and 24, the first circuit board 43 is provided with a TCP (tape carrier package) 150 as a circuit element. The TCP 150 produces a great deal of heat in operation because of high speed operation and large capacity resulting from an increased number of functions of the computer 1. The TCP 150 is situated on the bottom surface 43b of the first circuit board 43 below the keyboard 21.

Figure 23:
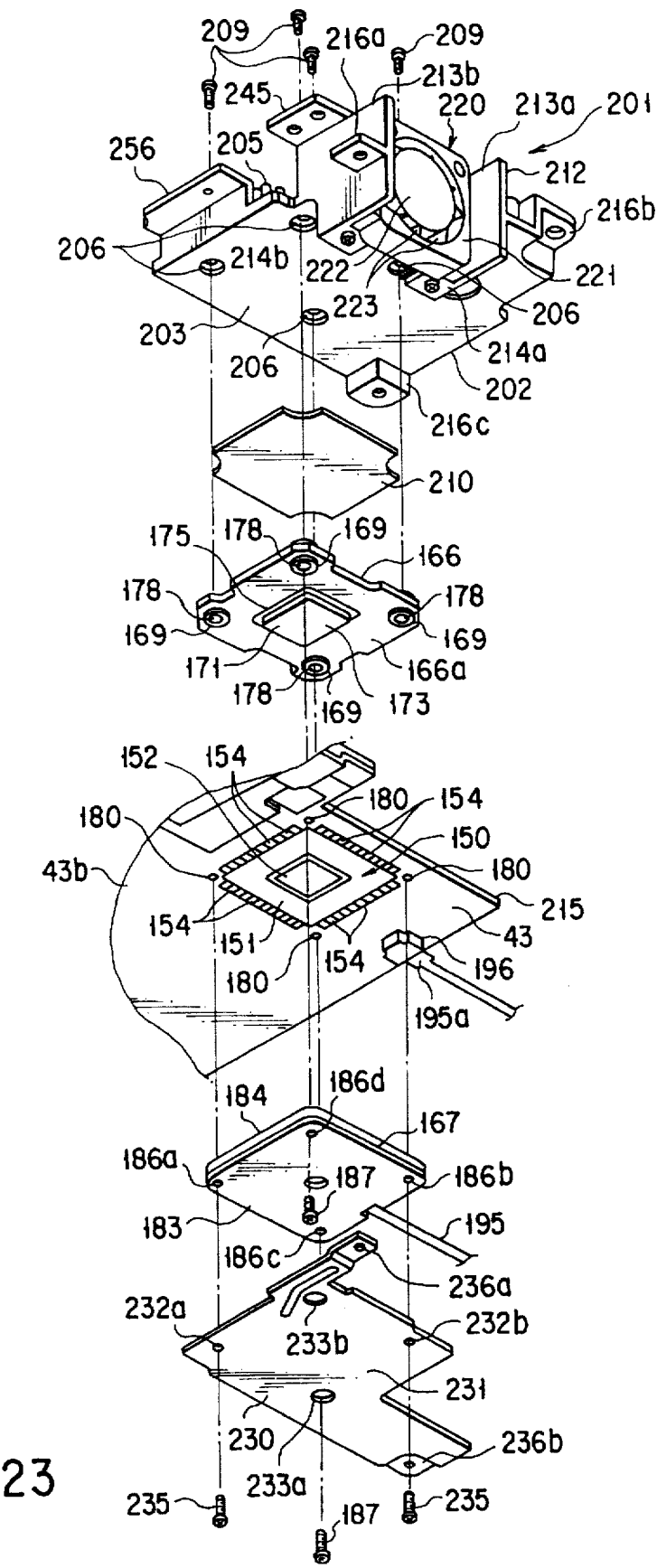

As is shown in FIGS. 21A and 23, the TCP 150 comprises a carrier 151 formed of a soft resin film and an IC chip 152 supported on the carrier 151. The carrier 151 has a rectangular shape with four edge portions. The carrier 151 has a great number of leads 154 formed of copper foil. Each lead 154 has a first end led out of the edge of the carrier 151 and a second end opposed to the first end.

The IC chip 152 has a substantially square shape and has a top surface 152a and a bottom surface 152b. A number of bumps (not shown) are formed on the bottom surface 152b. The second ends of the leads 154 are bonded to the bumps. Connection portions between the leads 154 and bumps are covered with potting resin 155. The potting resin 155 continuously covers the bottom surface 152b of the IC chip 152. The top surface 152a of the IC chip 152 is not covered with the potting resin 155. The top surface 152a is covered with an electrically conductive plating layer.

As is shown in FIG. 21A, the TCP 150 is mounted on the first circuit board 43 in a so-called "face-up" position in which the bottom surface 152b of the IC chip 152 is located on a side opposite to the first circuit board 43. A plurality of connection pads 156 are arranged on the bottom surface 43b of the first circuit board 43. The first ends of the leads 154 are bonded to the connection pads 156 by means of soldering.

Figure 22:
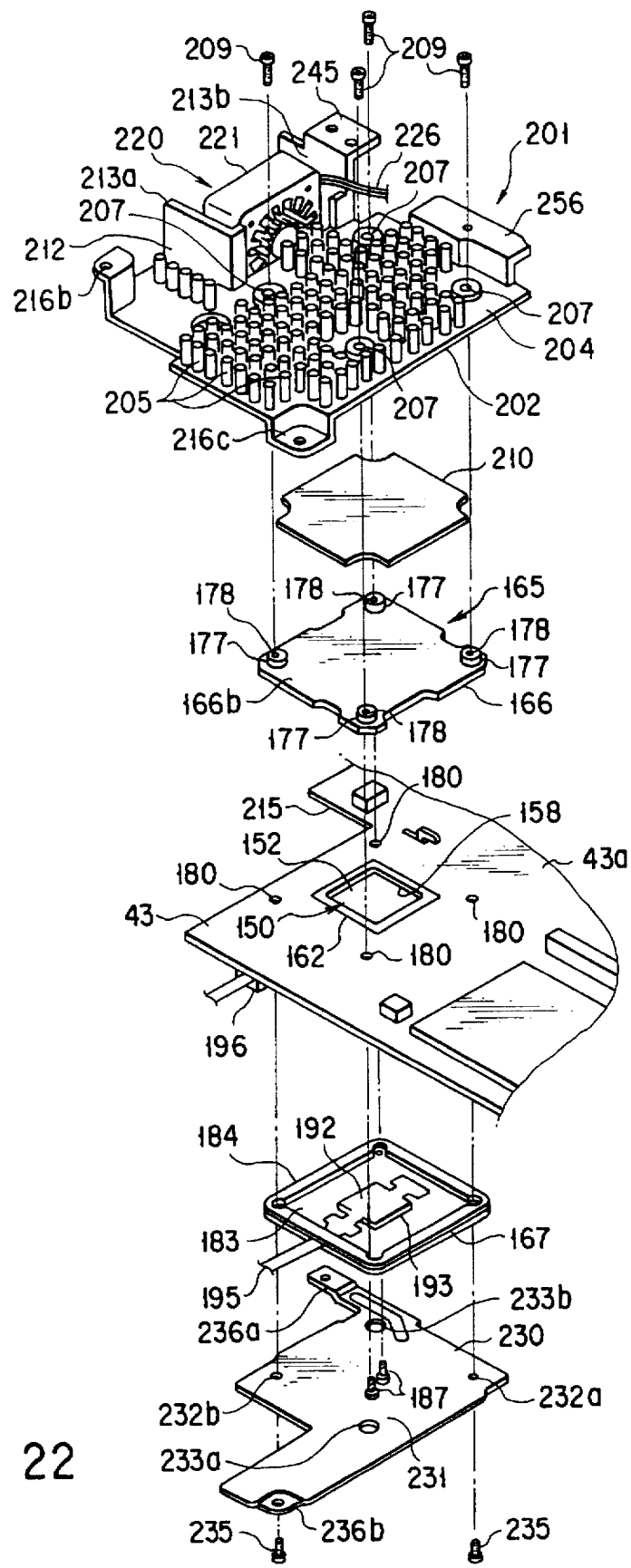

As shown in FIGS. 21A and 22, the first circuit board 43 has a square hole 158. The hole 158 is located in a position where the TCP 150 is mounted. The hole 158 faces the top surface 152a of the IC chip 152. The hole 158 has a shape similar to the shape of the IC chip 152 and has a size greater than the top surface 152a of the IC chip 152. The first circuit board 43 has many through-holes 160. The through-holes 160 are so arranged as to surround the hole 158. Each through-hole 160 has one end opening to the bottom surface 43b of the first circuit board 43 and the other end opening to the top surface 43a of the first circuit board 43. Said one end of the through-hole 160 is adjacent to the IC chip 152. As is shown in FIG. 21B, the inner surface of each through-hole 160 is coated with a plating layer 161. The plating layer 161 is formed of copper with excellent heat conductivity. A heat conductive layer 162 is formed on the top surface 43a of the first circuit board 43 by coating a copper foil. The heat conductive layer 162 is so situated as to surround the hole 158. The heat conductive layer 162 is continuous with the plating layers 161 on the inner surfaces of the through-holes 160.

As is shown in FIGS. 21A, 22 and 23, a heat radiation unit 165 for receiving heat from the TCP 150 is attached to the first circuit board 43. The heat radiation unit 165 comprises a heat conduction member 166 and a cover 167. The heat conduction member 166 is formed of a metallic material with excellent heat conductivity, such as brass or an aluminum alloy. The heat conduction member 166 is disposed on the top surface 43a of the first circuit board 43. The heat conduction member 166 has a flat square shape, and the plan shape thereof is much larger than the hole 158. The heat conduction member 166 has a flat lower surface 166a opposed to the top surface 43a of the first circuit board 43, and an upper surface 166b serving as heat conduction surface exposed on the upper side of the first circuit board 43. The lower surface 166a has four corner portions, and each corner portion is provided with a seat portion 169. The seat portion 169 slightly projects from the lower surface 166a. A distal end surface of the seat portion 169 is in contact with the top surface 43a of the first circuit board 43. Thus, as shown in FIG. 21A, the lower surface 166a of the heat conduction member 166 is separated from the top surface 43a of the first circuit board 43 by a distance corresponding to the height of the seat portion 169. A first heat insulation gap 170 is provided between the heat conduction member 166 and the first circuit board 43.

A central portion of the lower surface 166a of the heat conduction member 166 is provided with a heat receiving part 171. The heat receiving part 171 is integral with the heat conduction member 166 and projects downward from the lower surface 166a of the heat conduction member 166. The heat receiving part 171 enters the hole 158. A second heat insulation gap 172 is defined between the outer periphery of the heat receiving part 171 and the inner peripheral wall of the hole 158. The heat receiving part 171 has a flat heat receiving surface 173 exposed to the bottom surface 43b of the first circuit board 43 through the hole 158. The heat receiving surface 173 is substantially flush with the bottom surface 43b of the first circuit board 43. The area of the heat receiving surface 173 is greater than that of the top surface 152a of the IC chip 152. The top surface 152a of the IC chip 152 is bonded to the heat receiving surface 173 by means of a heat conductive adhesive 174.

As shown in FIG. 21B, a projection 175 surrounding the heat receiving part 171 is formed on the lower surface 166a of the heat conduction member 166. Like the seat portion 169, the projection 175 slightly projects from the lower surface 166a. The projection 175 has a flat distal end surface 175a. The distal end surface 175a is in contact with the heat conductive layer 162 of the first circuit board 43 and seals the said other end of the through-hole 160. The upper surface 166b of the heat conduction member 166 has four corner portions, each of which is provided with a boss portion 177. The boss portion 177 projects upward from the upper surface 166b in a position corresponding to the associated seat portion 169. The heat conduction member 166, as shown in FIGS. 20 and 21A, has four screw holes 178 extending from the seat portions 169 to the boss portions 177. Each screw hole 178 has one end opening to the distal end surface of the associated seat portion 169 and the other end opening to the upper surface of the associated boss portion 177.

As shown in FIGS. 22 to 24, the first circuit board 43 has four attachment holes 180. The attachment holes 180 are located outside the mounting region of the TCP 150. The attachment holes 180 communicate with the threaded holes 178 in the heat conduction member 166.

As is shown in FIGS. 21A and 22, the cover 167 is disposed on the bottom surface 43b of the first circuit board 43. The cover 167 comprises a square panel 183 and a support frame 184 adhered to the upper surface of the panel 183. The panel 183 is formed of a metallic material with excellent heat conductivity, such as an aluminum alloy, and has substantially the same size as the heat conduction member 166. A central portion of the upper surface of the panel 183 faces the bottom surface 152b of the IC chip 152. The support frame 184 is formed of a synthetic resin material and surrounds a connection portion between the leads 154 of the TCP 150 and the connection pads 156. Thus, the cover 167 totally covers not only the TCP 150 but also the connection portion between the TCP 150 and the first circuit board 43.

As is shown in FIG. 23, the panel 183 has four corner portions in which first to fourth insertion holes 186a to 186d are formed. The first to fourth insertion holes 186a to 186d communicate with the screw holes 178 in the heat conduction member 166 via the attachment holes 180 in the first circuit board 43. Screws 187 are passed through the third and fourth insertion holes 186c and 186d of the four insertion holes 186a to 186d from under the cover 167, which insertion holes 186c and 186d are located on a diagonal line of the panel 183. The screws 187 are engaged in the screw holes 178 in the heat conduction member 166 through the attachment holes 180. Similarly, screws 235 are passed through the first and second insertion holes 186a and 186d from under the cover 167, which insertion holes 186a and 186b are located on a diagonal line of the panel 183. The screws 235 are engaged in the screw holes 178 in the heat conduction member 166 through the attachment holes 180. By the engagement, the heat conduction member 166 and cover 167 are fastened to each other with the first circuit board 43 interposed, and the TCP 150 is interposed between the cover 167 and first circuit board 43.

As is shown in FIGS. 21A and 24, an elastic sheet 189 is adhered to a central portion on the upper surface of the panel 183. The elastic sheet 189 is formed of a heat-conductive, rubber-like elastic material in which alumina is added to silicone resin. A small hole 190 is formed in a central portion of the elastic sheet 189. The elastic sheet 189 is clamped between the panel 183 and the bottom surface 152b of the IC chip 152 by the fastening of the screws 187 and 235. By virtue of the elastic sheet 189, good contact is maintained between the panel 183 and IC chip 152, and heat of the IC chip 152 is efficiently transmitted to the panel 183.

The cover 167 is provided with a thermistor 191 for measuring the heat of the IC chip 152. As is shown in FIGS. 21A and 24, the thermistor 191 is supported on a thin flexible wiring board 192. The wiring board 192 is attached to the elastic sheet 189 with a reinforcement plate 193 interposed. The thermistor 191 is buried in the small hole 190 in the elastic sheet 189 and faces the central portion of the panel 183. Thus, the thermistor 191 measures the temperature of the panel 183 which receives heat principally from the IC chip 152.

As is shown in FIG. 24, the wiring board 192 has a thin lead portion 195 which extends out of the cover 167. A terminal portion 195a is formed at a distal end of the lead portion 195. The terminal portion 195a is connected to a connector 196 on the bottom surface 43b of the first circuit board 43. Thus, the information on the temperature of the panel 183, which was measured by the thermistor 191, is input to a control unit of the first circuit board 43.

As is shown in FIGS. 22 and 23, a heat sink 201 is detachably mounted on the heat conduction member 166. The heat sink 201 is formed by die-casting a metallic material with high heat conductivity, such as an aluminum alloy. The heat sink 201 has a heat radiation panel 202. The heat radiation panel 202 has a flat lower surface 203 facing the upper surface 166b of the heat conduction member 166. The lower surface 203 has a much greater plan shape than the upper surface 166b. The upper surface of the heat radiation panel 202 is a flat heat radiation surface 204 exposed to the inside of the casing 3. A number of cylindrical heat radiation projections 205 are integrally provided on the heat radiation surface 204. A sufficient heat radiation area of the heat radiation surface 204 is provided by the presence of the projections 205.

As is shown in FIGS. 21A and 23, four engaging portions 206 are opened in the lower surface 203 of the radiation panel 202. The boss portions 177 of the heat conduction member 166 are engaged in the engaging portions 206. By the engagement between the engaging portions 206 and boss portions 177, the heat conduction member 166 and the heat radiation panel 202 are positioned. The engaging portions 206 project upward from the radiation surface 204 of the radiation panel 202, and a communication hole 207 is opened in a top end portion of each engaging portion 206. Each communication hole 207 communicates with the screw hole 178 of the associated boss portion 177 and opens at the upper surface of the engaging portion 206. A screw 209 is inserted in the communication hole 207 from above. The screw 209 is engaged in the screw hole 178 in the associated boss portion 177. By the engagement, the heat radiation panel 202 and heat conduction member 166 are coupled.

A soft-elastic sheet 210 is provided between the lower surface 203 of the heat radiation panel 202 and the upper surface 166b of the heat conduction member 166. The elastic sheet 210 is formed of a heat-conductive, rubber-like elastic material in which alumina is added to silicone resin. The elastic sheet 210 is clamped between the lower surface 203 of the heat radiation panel 202 and the upper surface 166b of the heat conduction member 166 by the fastening of the screws 209. Thus, the upper surface 166b of the heat conduction member 166 is in contact with the lower surface 203 of the heat radiation panel 202 with the elastic sheet 210 interposed, and the heat of the IC chip 152 led to the heat conduction member 166 is efficiently transmitted to the heat radiation panel 202.

As shown in FIG. 5, the heat radiation panel 202 is located on the left-hand portion of the rear end part of the first circuit board 43 and adjoins the hard disk mounting section 100. A fan support portion 212 is integrally formed at the rear end part of the heat radiation panel 202. As is clear from FIG. 23, the fan support portion 212 comprises a pair of support walls 213a and 213b extending to a level above the heat radiation panel 202, and horizontal tongue portions 214a and 214b continuous with the lower end portions of the support walls 213a and 213b. The support walls 213a and 213b are situated apart from each other in the width direction of the lower housing 4. The fan support portion 212 is located on the rear end part of the first circuit board 43 and adjoins the rear wall 4e of the lower housing 4. In this case, a notch 215 for avoiding the fan support portion 212 is formed at a left-hand, rear end corner portion of the first circuit board 43. Thus, lower end portions of the support walls 213a and 213b project downward below the first circuit board 43 through the notch 215.

Figure 25:
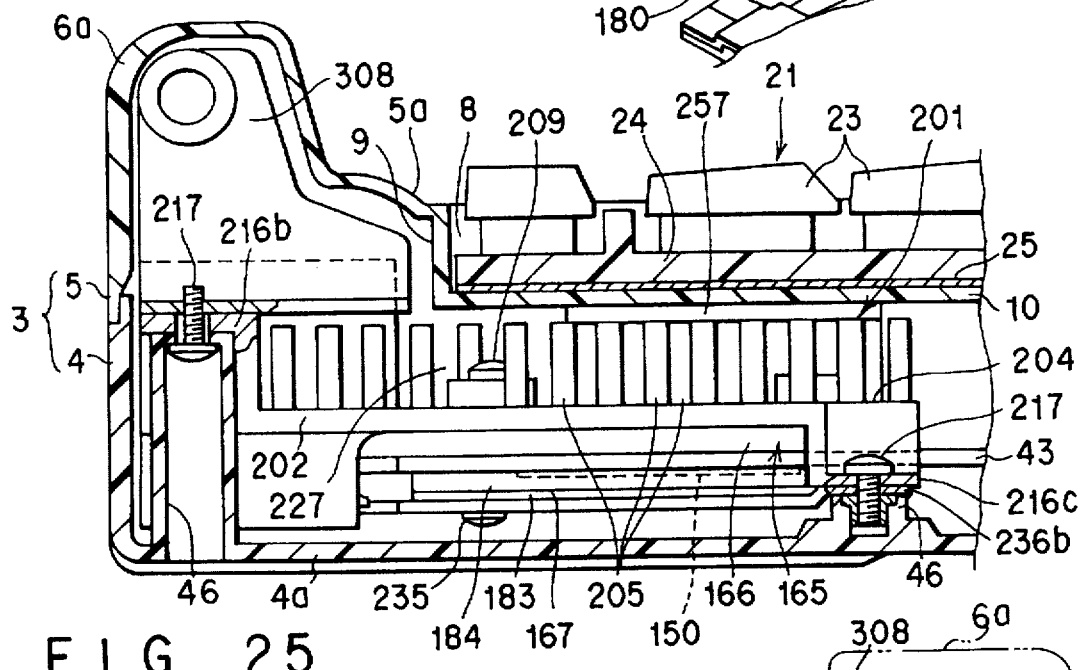

As shown in FIGS. 23, 25 and 26, coupling portions 216a to 216c are integrally formed on a rear end portion of the fan support portion 212 and a left-hand portion of the heat radiation panel 202. The coupling portion 216a of the fan support portion 212 is superposed on the top surface 43a of the first circuit board 43 and fixed to the boss portion 46 of the lower housing 4 by means of the screw 47. The coupling portions 216b and 216c of the heat radiation panel 202 are fixed to the boss portions 46 of the lower housing 4 by other screws 217. Thus, the heat sink 201 is supported by both the first circuit board 43 and lower housing 4.

As is shown in FIG. 23, an electric cooling fan 220 is supported on the fan support portion 212. The fan 220 has a fan frame 221 and a rotor 222 supported on the fan frame 221. A plurality of blades 223 are integrally formed on the outer peripheral surface of the rotor 222. The fan frame 221 is formed of a metallic material with high heat conductivity, such as an aluminum alloy. The fan frame 221 is situated between the support walls 213a and 213b of the fan support portion 212. A lower end portion of the fan frame 221 is fixed to the upper surfaces of the tongue portions 214a and 214b by screws. The fan frame 221 is thus integral with the heat radiation panel 202 via the support walls 213a and 213b, and a lower part of the rotor 222 extends to a level between the first circuit board 43 and the bottom wall 4a of the lower housing 4.

The fan 220 is connected to the first circuit board 43 via a lead wire 226, as shown in FIG. 5. Thus, the fan 220 is controlled by the control unit of the first circuit board 43. In the present embodiment, when the temperature of the panel 183 measured by the thermistor 191 exceeds 80° C., the fan 220 is driven.

As is shown in FIG. 25, the heat radiation panel 202 with the fan 220 is located below the support wall 10 in the keyboard mounting hole 8 and the reinforcement plate 25 of the keyboard 21. Parts of the support wall 10 and reinforcement plate 25 are opposed to the radiation surface 204 of the heat radiation panel 202. The support wall 10 and reinforcement plate 25 cooperate with the radiation surface 204, thereby defining a cooling air passage 227 within the casing 3. The cooling air passage 227 communicates with the fan 220, and the heat radiation projections 205 are located in the cooling air passage 227.

As is shown in FIGS. 5 and 26, the fan 220 is located on the side of the connector panel 85. The fan 220, along with the connector 85, is contained within the lower housing 4 and adjoins the rear wall 4e of the lower housing 4. The rear wall 4e has an exhaust port 228, as shown in FIG. 10. The exhaust port 228 faces the fan 220. When the fan 220 is driven, air in the cooling air passage 227 and air between the first circuit board 43 and the bottom wall 4a of the lower housing 4 is sucked toward the rotor 222. The air is exhausted to the rear side of the casing 3 through the exhaust port 228.

As is shown in FIGS. 22 and 23, a sub-heat sink 230 is attached to the cover 167 of the heat radiation unit 165. The sub-heat sink 230 is formed of a metallic material with high heat conductivity, such as an aluminum alloy. The sub-heat sink 230 has a flat plate member 231. The plate member 231 has a substantially square shape greater than the panel 183 of the cover 167. The plate member 231 is superposed on the lower surface of the panel 183. The plate member 231 has a pair of first communication holes 232a and 232b and a pair of second communication holes 233a and 233b. The first and second communication holes 232a, 232b, 233a and 233b are located on diagonal lines of the plate member 231 and communicate with the first to fourth insertion holes 186a to 186d in the panel 183. The screws 235 are passed through the first communicaion holes 232a and 232b from under the plate member 231. Thus, the plate member 231 is supported on the panel 183 of the cover 167 by means of the screws 235. Each of the second communication holes 233a and 233b has a diameter greater than the diameter of the head of each screw 187. The heads of the screws 187 are contained inside the second communication holes 233a and 233b.

As is shown in FIGS. 22 and 23, the plate member 231 is provided with a pair of brackets 236a and 236b. One of the brackets, 236a, is interposed between the first circuit board 43 and the boss portion 46 of the lower housing 4, as shown in FIG. 26, and fixed to the boss portion 46 by means of the screw 47. The other bracket 236b is interposed between the coupling portion 216c of the heat radiation panel 202 and the boss portion 46 of the lower housing 4, as shown in FIG. 25, and fixed to the boss portion 46 by means of the screw 217. The sub-heat sink 230 is in contact with the lower housing 4 and radiation panel 202.

As is shown in FIG. 5, the heat sink 201 is adjacent to the rear end portion of the left-hand side wall 4b of the lower housing 4. A number of cooling air inlets 240 are formed in the side wall 4b. The cooling air inlets 240 are located on the front side of the heat sink 201 and face the left-hand edge portions of the second circuit board 44. Thus, the cooling air inlets 240 are located opposite to the fan 220, with the cooling air passage 227 interposed.

As is shown in FIG. 26, the support wall 213b of the fan support portion 212 is adjacent to the connector panel 85. A bracket 245 is integrally formed at an upper end portion of the support wall 213b. A first heat radiation plate 246 is attached to the bracket 245. The first heat radiation plate 246 is formed of a metallic material with high heat conductivity, such as an aluminum alloy. The first heat radiation plate 246 comprises an elongated plate body 247 extending in the width direction of the lower housing 4, and a coupling portion 248 connected to one end of the plate body 247. The plate body 247 is provided at an upper side of the connector panel 85, and a rear end portion of the plate body 247 is engaged with the engaging portion 85a of the connector panel 85. The coupling portion 248 is fixed to the lower surface of the bracket 245 of the support wall 213b by means of a screw 250. Thus, the first heat radiation plate 246 extends between the radiation panel 202 and connector panel 85, and the heat of the radiation panel 202 is let to escape to the connector panel 85.

As shown in FIG. 32, the first heat radiation plate 246 is located below the rear end portion of the upper housing 5.

A number of radiation holes 252 are formed in the rear end portion of the upper housing 5. The radiation holes 252 face the first heat radiation plate 246, and external air is led to the surrounding of the first heat radiation plate 246 through the radiation holes 252. A number of cooling fins 253 are formed on the upper surface of the plate body 247 of the first heat radiation plate 246. By virtue of the cooling fins 253, a sufficient contact area is maintained between the plate body 247 and the surrounding air.

As shown in FIGS. 3 and 4, a support wall 256 is integrally formed on the right-hand end portion of the heat radiation panel 202. As is clear from FIG. 13, the support wall 256 extends upward from the heat radiation surface 204 at a location adjacent to the HDD 103. A second heat radiation plate 257 is attached to the upper end of the support wall 256. The second heat radiation plate 257 is formed of a metallic material with high heat conductivity, such as an aluminum alloy. The second heat radiation plate 257 has a plate body 258 extending across the upper side of the HDD 103 in the width direction of the casing 3. One end portion of the plate body 256 is fixed to the upper surface of the support wall 256 by means of a screw 259. The plate body 258 faces the keyboard mounting hole 3. The upper surface of the plate body 258 is substantially flush with the support wall 10 in the keyboard mounting hole 8, the upper surface 93a of the card case 93 and the top portion of the projection 135 of the bracket 121. The upper surface of the plate body 258 is in contact with the reinforcement plate 25 of the keyboard 21. Thus, the second heat radiation plate 257 lets the heat of the heat radiation panel 202 escape to the reinforcement plate 25 and supports the keyboard 21 from below.

Figure 27:
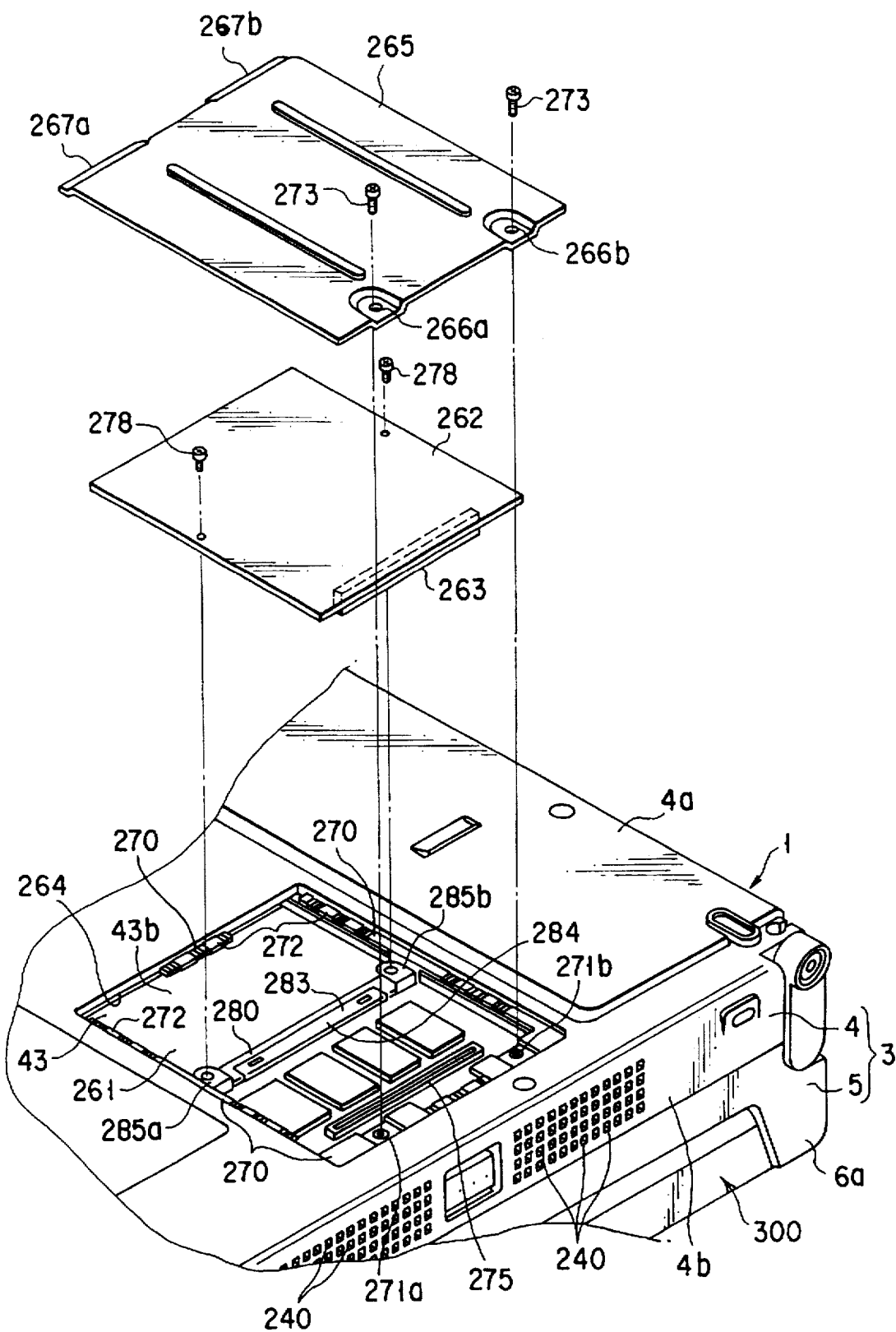
Figure 28B:
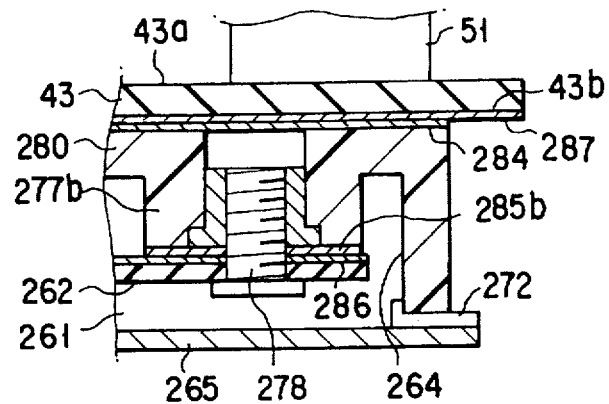
FIG. 28B is an enlarged cross-sectional view showing a portion 28B in FIG. 28A.
Figure 29:
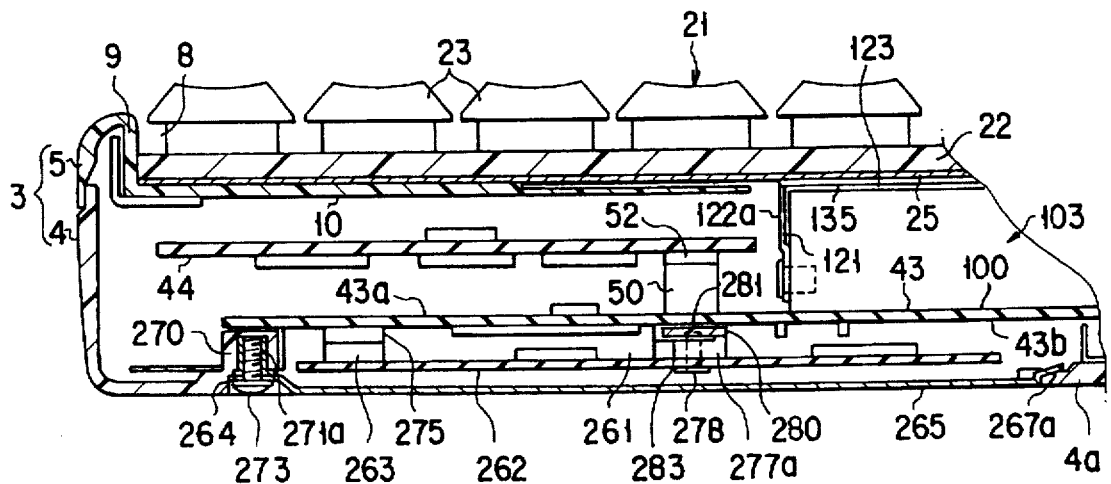

As is shown in FIGS. 27 to 29, an extension space 261 is provided within the casing 3. The extension space 261 is located between the bottom wall 4a of the lower housing 4 and the first circuit board 43 and the extension space 261 adjoins the TCP 150. The extension space 261 serves to contain an extension memory board 262. The memory board 262 has a stacking connector 263 on its upper surface opposed to the first circuit board 43. The stacking connector 263 is located on one end side portion of the memory board 262.

The extension space 261 has a board insertion hole 264 for insertion/removal of the memory board 262. The board insertion hole 264 is opened in the bottom wall 4a of the lower housing 4. The board insertion hole 264 is closed by a removable bottom cover 265. The bottom cover 265 is formed of a metal plate member and has a substantially flat, rectangular shape. The bottom cover 265 has one end portion provided with a pair of screw insertion holes 266a and 266b and the other end portion provided with a pair of engaging portions 267a and 267b. The screw insertion holes 266a and 266b and the engaging portions 267a and 267b are located apart from each other in the width direction of the bottom cover 265.

A support portion 270 for receiving a peripheral edge portion of the bottom cover 265 is formed on an opening edge portion of the board insertion hole 264. The support portion 270 is provided with a pair of nuts 271a and 271b facing the screw insertion holes 266a and 266b and a number of metallic conductive tongues 272 to be put in contact with the bottom cover 265. The bottom cover 265 is superposed on the support portion 270 in the board insertion hole 264 in the state in which the engaging portions 267a and 267b are hooked on the opening edge portion of the board insertion hole 264. Screws 273 are inserted through the screw insertion holes 266a and 266b in the bottom cover 265 and engaged in the nuts 271a and 271b. Thus, the bottom cover 265 is fixed to the bottom wall 4a of the lower housing 4.

A stacking connector 275 is disposed on the bottom surface 43b of the first circuit board 43 exposed to the extension space 261. The stacking connector 275 is coupled to the stacking connector 263 of the memory board 262. By this coupling, the first circuit board 43 is electrically connected to the memory board 262.

As shown in FIG. 28A, a pair of boss portions 277a and 277b for receiving the memory board 262 is provided in the extension space 261. The boss portions 277a and 277b are integrally formed on the support portion 270 in the board insertion hole 264. The boss portions 277a and 277b are separated in the depth direction of the lower housing 4 inside the board insertion hole 264. A middle portion of the memory board 262 is superposed on the lower surfaces of the boss portions 277a and 277b. The memory board 262 is removably supported on the boss portions 277a and 277b by means of screws 278.

As is shown in FIG. 29, the boss portions 277a and 277b are located just below the coupling region between the first stacking connector 50 and third stacking connector 52. The boss portions 277a and 277b are integrally coupled to each other by means of a bridge portion 280. As shown in FIG. 28A, the upper surfaces of the boss portions 277a and 277b and bridge portion blend into a flat support surface 281. The support surface 281 extends in the depth direction of the lower housing 4 along the first and third stacking connectors 50 and 52.

A metallic conductive tongue 283 is attached to the bridge portion 280, as shown in FIGS. 27 and 28A. The conductive tongue 283 integrally includes a pair of first conductive tongue 285a and 285b covering the lower surfaces of the boss portions 277a and 277b, and a second conductive portion 284 covering the support surface 281. The first conductive portions 285a and 285b are put in contact with the upper surface of the memory board 262. A ground wiring layer 286, as shown in FIG. 28B, is provided on the upper surface of the memory board 262. When the memory board 262 is screwed down onto the boss portions 277a and 277b, the ground wiring layer 286 is put in contact with the first conductive portions 285a and 285b. Thereby, the memory board 262 is grounded to the casing 3. The second conductive portion 284 is in contact with the bottom surface 43b of the first circuit board 43. As shown in FIG. 28B, a ground wiring layer 287 is provided on the bottom surface 43b of the first circuit board 43. The ground wiring layer 287 extends along the bridge portion 280. When the first circuit board 43 is fixed to the lower housing 4, the ground wiring layer 287 is put in contact with the second conductive portion 284. Thus, the first circuit board 43 is grounded to the casing 3. Besides, the support surface 281 of the bridge 280 is put in indirect contact with the bottom surface 43b of the first circuit board 43 with the second conductive portion 284 interposed. Accordingly, the bridge portion 280 supports the first circuit board 43 from below in a position corresponding to the coupling region between the first stacking connector 50 and third stacking connector 52.

According to this structure, even if the third stacking connector 52 is pressed on the first stacking connector 50 when the first and second circuit boards 43 and 44 are connected, the coupling region between the stacking connectors 50 and 52 can be supported from below by the boss portions 277a and 277b and bridge portion 280. Thus, when the first and third stacking connectors 50 and 52 are coupled, it is possible to prevent the first circuit board 43 from bending downward or sinking. Thereby, the stacking connectors 50 and 52 can be coupled surely and easily.

As is shown in FIG. 1, a display unit 300 is supported on display support portions 6a and 6b of the casing 3. The display unit 300 comprises a flat box-shaped housing 301 and a color liquid crystal display (LCD) 302 contained within the housing 301. The housing 301 comprises a front panel 303 and a rear panel 304 coupled to the front panel 303. The front panel 303 has an opening portion 305 through which the color LCD 302 is exposed.

The housing 301 has a coupling portion 307 interposed between the display support portions 6a and 6b. The coupling portion 307 extends in the width direction of the casing 3. Both end portions of the coupling portion 307 are rotatably supported on the display support portions 6a and 6b by means of hinge devices 308 (one of which is shown in FIGS. 25 and 26). Thus, the display unit 300 is rotatable between a closed position where the display unit 300 covers the armrest 7 and keyboard 21 from above, and an open position where the color LCD 302 is erected on the rear side of the keyboard 21.

As shown in FIG. 30, the coupling portion 307 has a recess portion 310. A cable 311 connected to a driving circuit of the color LCD 302 is led into the recess portion 310. The recess portion 310 faces the rear end portion of the upper wall 5a of the upper housing 5. A cable guide 313 communicating with the inside of the casing 3 is attached to the rear end portion of the upper wall 5a. The cable guide 313 enters the recess portion 310.

As is shown in FIG. 20, a cable insertion hole 314 is opened in a side face of the cable guide 313. The cable insertion hole 314 is opposed to a side face of the recess portion 310. Accordingly, the cable 311 is led from the side face of the recess portion 310 into the inside of the casing 3 via the cable insertion hole 314 and cable guide 313. The cable 311 is led to a region below the right-hand end portion of the keyboard 21 along the inner surface of the rear end portion of the upper wall 5a. The cable 311 has a connector 315 at its distal end, and the connector 315 is connected to the first circuit board 43.

As shown in FIGS. 30 and 32, an icon mounting hole 318 is formed in the rear end portion of the upper wall 5a. The icon mounting hole 318 is located immediately behind the keyboard mounting hole 8. An icon 319 is provided in the icon mounting hole 318. The icon 319 is formed of a light-transmissive synthetic resin material and adhered to the icon mounting hole 318. A plurality of display marks 321 are described on the surface of the icon 319. The display marks 321 represent the operation modes and functions of the computer 1 in the form of figures. The display marks 321 are arranged at intervals in the width direction of the casing 3. When the display unit 300 is rotated to the open position, the display marks 321 are exposed on the casing 3.

As is shown in FIG. 30, a holder 325 of a synthetic resin is disposed inside the rear end portion of the upper housing 5. The holder 325 comprises a board support portion 326, a loudspeaker support portion 327, and a cable support portion 328. These support portions 326 to 328 are linearly arranged along the opening rear edge of the keyboard mounting hole 8. The board support portion 326 and cable support portion 328 are supported on the inner surface of the upper wall 5a by means of screws 329.

As shown in FIG. 32, the board support portion 326 is situated below the icon 319. A diode board 331 is supported on the upper surface of the board support portion 326. The diode board 331 is substantially parallel to the icon 319. A flexible wiring board 332 is attached to the upper surface of the diode board 331. The wiring board 332 has an elongated lead portion 322a. A distal end portion of the lead portion 332a is connected to the first circuit board 43. A plurality of light-emitting diodes (LED) 333 are linearly arranged on the upper surface of the wiring board 332. The LEDs 333 face the display marks 321 of the icon 319. When any of the LEDs 33 emits light, the associated display mark 321 is lighted and the operation mode or function of the computer 1 is displayed.

As shown in FIGS. 30 and 33, a disk-like loudspeaker 335 is supported on the loudspeaker support portion 327. The loudspeaker 335 comprises an annular frame 336 for supporting a vibration plate (not shown) and a guard 337 covering a front face of the vibration plate. The loudspeaker support portion 327 has a circular engaging portion 340 in which the loudspeaker 335 is fitted. As shown in FIG. 33, the engaging portion 340 extends from the rear end portion of the upper wall 5a to a region below the keyboard 21. The engaging portion 340 is inclined downward from the region of the upper wall 5a to the region of the keyboard 21. Thus, the loudspeaker 335 is housed in the casing 3 in a position inclined toward the keyboard 21. The front half portion of the loudspeaker 335 is located in the region below the keyboard 21. The loudspeaker 335 has a lead wire 348 which is connected to the first circuit board 43.

The loudspeaker 335 is engaged in the engaging portion 340 with a loudspeaker support 341 interposed. The loudspeaker support 341 is formed of an elastic rubber material. The loudspeaker support 341 has an annular support body 342 to be engaged with the frame 336 of the loudspeaker 335. An upwardly extending sound shield wall 343 is integrally formed on a front half portion of the support body 342. As is shown in FIG. 33, an upper end portion of the sound shield wall 343 is put in contact with the lower surface of the reinforcement plate 25 of the keyboard 21 and the lower surface of the second heat radiation plate 257. Thus, the sound shield wall 343 cooperates with the reinforcement plate 25 and second heat radiation plate 257, thereby defining a space 345. The front half portion of the loudspeaker 335 is located in the space 345. As shown in FIG. 33, the rear half portion of the loudspeaker 335 is located below the upper wall 5a. A plurality of slits 346 facing the rear half portion of the loudspeaker 335 are made in the upper wall 5a. The slits 346 are located on the side of the icon 319.

When the holder 325 supporting the loudspeaker 335 is mounted on the upper housing 5, as shown in FIGS. 31 and 33, the peripheral wall 9 defining the keyboard mounting hole 8 is located between the front half portion and rear half portion of the loudspeaker 335. A notch 347 is formed in a lower end portion of the peripheral wall 9. By virtue of the notch 347, the space 345 communicates with the rear half portion of the loudspeaker 335.

According to this structure for attaching the loudspeaker 335, the sound shield wall 343 of the loudspeaker support 341 cooperates with the reinforcement plate 25 of the keyboard 21 and second heat radiation plate 257, thereby defining the space 345 to which the front half portion of the loudspeaker 335 is exposed. Thus, sound from the front half portion of the loudspeaker 335 is released to the space 345 and prevented from reaching the inside of the casing 3 by virtue of the sound shield wall 343. The sound released to the space 345 is led to the rear half portion of the loudspeaker 335 via the notch 347, and it is released to the outside of the casing 3 via the slits 346 in the upper wall 5a, along with sound released from the rear half portion of the loudspeaker 335. Accordingly, even though the front half portion of the loudspeaker 335 is located below the keyboard 21, the sound quality of the loudspeaker 335 can be improved and the volume of sound released to the outside of the casing 3 can be increased.

As is shown in FIG. 30, the cable support portion 328 of the holder 325 has a bottom wall 350 facing the upper wall 5a. The bottom wall 350 is located below the cable guide 313, and a core (not shown) of the cable 311 is held on the bottom wall 350.

Figure 34:
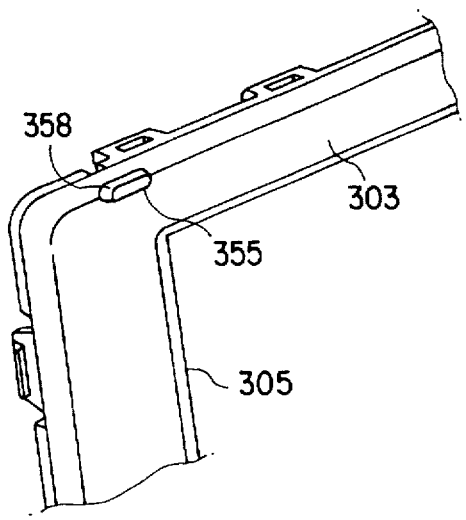
Figure 35:
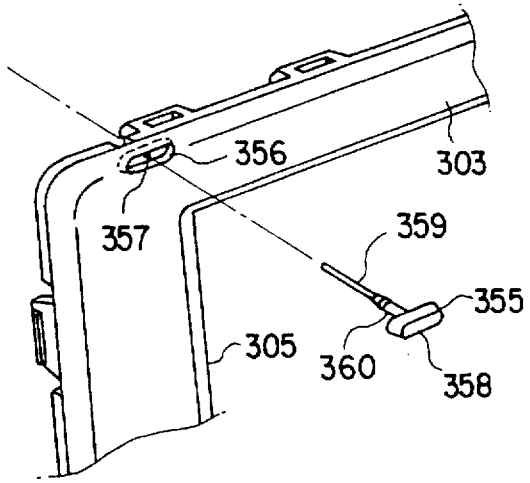

Referring back to FIG. 1, a pair of shock absorbers 355 are attached to the housing 301 of the display unit 300. The shock absorbers 355 prevent collision between the front panel 303 of the housing 301 and the armrest 7 when the display unit 300 is rotated to the closed position. The shock absorbers 355 are formed of an elastic rubber material. As is shown in FIGS. 34 and 35, the shock absorbers 355 are attached to end portions of the front panel 303. Recess portions 356 for attaching the shock absorbers 355 are formed in the front panel 303. A small-diameter insertion hole 357 is made in a terminal end face of each recess portion 356. The insertion hole 357 is opened to the inside of the front panel 303.

Each shock absorber 355 integrally comprises a body 358 to be engaged in the recess portion 356 and a string-like tail portion 359 continuous with the body 358. An end portion of the tail portion 359, which is continuous with the body 358, is integrally provided with a large-diameter portion 360. The diameter of the large-diameter portion 360 is a little greater than the diameter of the insertion hole 357.

The method of attaching each shock absorber 355 to the front panel 303 will now be described. At first, a distal end portion of the tail portion 359 is inserted into the insertion hole 357 from the outside of the front panel 303. Then, the distal end portion of the tail portion 359 is held by the fingers on the inside of the front panel 303 and the tail portion 359 is pulled to the inner side of the front panel 303. Thereby, the body 358 of the shock absorber 355 is engaged in the recess portion 357. At the same time, the large-diameter portion 360 of the tail portion 359 is tightly fitted in the insertion hole 357, thus preventing the removal of the body 358 from the recess portion 356. Thus, as shown in FIG. 34, the body 358 is held in the front panel 303 in the state in which the body 358 slightly projects from the front surface of the front panel 303.

According to the structure of attaching each shock absorber 355, the body 358 of the shock absorber 355 is forcibly pulled into the recess portion 356 by pulling the tail portion 359 on the inside of the front panel 303. Therefore, the body 358 can be surely mounted in the recess portion 356, as compared to the case where the shock absorber 355 is pushed in the recess portion 356 on the front side of the front panel 303.

Furthermore, the shock absorber 355 can be attached to the front panel 303 only by passing the tail portion 359 through the insertion hole 357 and pulling the tail portion 359. Thus, the shock absorbers 355 can be easily attached.

When the computer 1 having the above structure is operated, the IC chip 152 of the TCP 150 produces heat. The IC chip 152 is clamped between the heat conduction member 166 and cover 167 attached to the first circuit board 43, and the heat receiving part 171 of the heat conduction member 166 is in contact with the top surface 152a of the IC chip 152. Thus, the heat of the IC chip 152 is transmitted to the heat conduction member 166 via the heat receiving part 171. Thus, a first heat conduction path extending from the top surface 152a of the IC chip 152 to the heat conduction member 166 is constituted.

In this case, the first heat insulating gap 170 is provided between the heat conduction member 166 and the first circuit board 43, and the second heat insulating gap 172 is provided between the heat receiving part 171 and the hole 158 in the first circuit board 43. Thus, the heat of the IC chip 152 conducted to the heat conduction member 166 is not easily transmitted to the first circuit board 43 and a thermal influence on the first circuit board 43 is reduced.

The bottom surface 152b of the IC chip 152 is put in contact with the panel 183 of the cover 167 with the heat-conductive elastic sheet 189 interposed. Thus, the heat of the IC chip 152 is conducted to the panel 183 via the elastic sheet 189, and a second heat conduction path extending from the bottom surface 152b of the IC chip 152 to the cover 167 is constituted. The first circuit board 43 has many through-holes 160 around the hole 158 in which the heat receiving part 171 is located. The aforementioned other end (i.e. upper end) of each through-hole 160 is in contact with the projection 175 of the heat conduction member 166. Thus, even if the opening portion of the hole 158 in the first circuit board 43 receives heat of the heat receiving part 171, the heat is let to escape directly to the heat conduction member 166 via the inner space of the through-holes 160. In addition, the first circuit board 43 has the heat conductive layer 162 on the contact portion with the projection 175. Since the heat conductive layer 162 is continuous with the plating layer 161 on the inner face of the through-hole 160, the heat conducted to the opening portion of the hole 158 is positively let to escape to the heat conductive member 166 via the plating layer 161 and heat conductive layer 162.

Thus, the heat of the IC chip 152 is efficiently let to escape to the top surface 43a and bottom surface 43b of the first circuit board 43. As a result, the thermal influence on the first circuit board 43 is reduced, and the heat of the IC chip 152 does not easily remain in the first circuit board 43.

On the other hand, the heat radiation panel 202 of the heat sink 201 is put in contact with the heat conduction member 166 with the elastic sheet 210 interposed, and thus the heat of the IC chip 152 is conducted to the heat radiation panel 202 via the heat conduction member 166. Since the heat radiation surface 204 of the heat radiation panel 202 is provided with many radiation projections 205, the radiation surface area of the heat radiation panel 202 increases and the good radiation properties of the heat radiation panel 202 itself is maintained.

Similarly, the panel 183 of the cover 167 is in contact with the plate member 231 of the sub-heat sink 230. Thus, the heat of the IC chip 152 is also conducted to the plate member 231 via the panel 183. Furthermore, in the case of the present embodiment, the ambient temperature of the IC chip 152 is measured by the thermistor 191 attached to the cover 167. When the measured temperature exceeds 80° C., the fan 220 of the heat sink 201 is driven. If the fan 220 is driven, outside air of the computer 1 is sucked into the casing 3 via the cooling air inlets 240. The sucked air flows through the cooling air passage 227 between the heat radiation panel 202 and keyboard 21 as a cooling wind, and goes out of the casing 3 through the exhaust port 228 in the lower housing 4.

In this case, since the heat radiation panel 202 has many radiation projections 205 located along the cooling air passage 227, the radiation projections 205 is exposed to the cooling air. Thus, the heat of the IC chip 152 conducted to the heat radiation panel 202 is forcibly carried away by the cooling air. In addition, since the cooling air passage 227 is defined between the heat radiation panel 202 and keyboard 21, the cooling air guided to the heat radiation panel 202 does not diffuse in the inside of the casing 3. Therefore, the amount and flow rate of the air flowing in the cooling air passage 227 can be maintained adequately, and the heat radiation panel 202 can be cooled efficiently.

Furthermore, since the fan frame 221 of the fan 220 is formed of heat conductive material and attached to the fan support portion 212 of the heat radiation panel 202, the fan frame 221 can be used as part of the heat radiation panel 202. Besides, since the fan frame 221 is directly cooled by the cooling air, a high radiation performance can be maintained. Thus, the heat conducted from the heat radiation panel 202 to the fan frame 221 can be let to escape to the outside with high efficiency. Moreover, since the fan 220 is directly supported by the heat radiation panel 202, the proper positional relationship between the fan 220 and heat radiation plate 202 is maintained, and the flow of cooling air to the heat radiation panel 202 is neither shielded nor blocked. Accordingly, air smoothly flows around the heat radiation panel 202, and the radiation properties of the heat conduction member 166 and IC chip 152 can be enhanced by the heat radiation panel 202.

The heat radiation panel 202 of the heat sink 201 is continuous with the connector panel 85 via the first heat radiation plate 246 and thus a third heat conduction path extending from the heat radiation panel 202 to the connector panel 85 can be defined within the casing 3. Accordingly, the heat of the heat radiation panel 202 can be led to the connector panel 85 and this connector panel 85 can be used as heat sink.

Similarly, since the second heat radiation plate 257 attached to the heat radiation panel 202 is put in contact with the reinforcement plate 25 of the keyboard 21, a fourth heat conduction path extending from the heat radiation panel 202 to the reinforcement panel 25 can be defined within the casing 3. Accordingly, the heat of the heat radiation panel 202 can be led to the reinforcement plate 25 of the keyboard 21 and this reinforcement plate 25 can be used as heat sink.

Since the sub-heat sink 230 is coupled to the heat radiation panel 202, the heat conducted to the sub-heat sink 230 can be let to escape to the heat radiation panel 202 which is forcibly cooled. Besides, since the sub-heat sink 230 is in contact with the extended portion 85b of the connector panel 85 and with the bottom wall 4a of the lower housing 4, the heat conducted to the sub-heat sink 230 can be let to escape to the connector panel 85 and lower housing 4. Accordingly, the heat of the IC chip 152 conducted to the sub-heat sink 230 can be diffused over a broad region of the casing 3, and heat does not easily remain between the sub-heat sink 230 and the bottom wall 4a of the lower housing 4.

According to the first embodiment of the invention, the heat radiation perforce of the TCP 150, which is considered to be unsuitable for radiation by general radiation fins, can be enhanced by the combination of the heat conduction from the heat radiation unit 165 to the heat sink 201 and sub-heat sink 230 and the forcible air-cooling by the fan 220.

In addition, since the heat sink 201 and sub-heat sink 230 are removable from the heat radiation unit 165, the heat sink 201 and sub-heat sink 230 alone needs to be newly designed, for example, if the design of the computer 1 is changed or the shape of the casing 3 is changed. Thus, the parts such as heat conduction member 166 and cover 167 directly attached to the first circuit board 43 can be commonly used, irrespective of the type and specifications of the computer 1, and the design specifications of these parts can be standardized. As a result, the common use of parts for enhancing radiation of the TCP 150 is allowed, and the manufacturing cost can be reduced.

Moreover, the heat sink 201 can easily be attached to the heat conduction member 166 by simply superposing the heat radiation panel 202 on the upper surface 166b of the heat conduction member 166 such that the engaging portions 206 are engaged with the boss portions 177. Thus, the heat conduction member 166 and heat sink 201 can easily be positioned, and the heat sink 201 can easily be attached.

The present invention is not limited to the first embodiment. A second embodiment of the invention will now be described with reference to FIG. 36.

The second embodiment is the same as the first embodiment, except for the method of connection between the first circuit board 43 and TCP 150 and the transmission path of heat from the TCP 150 to the heat radiation panel 202.

Figure 36:
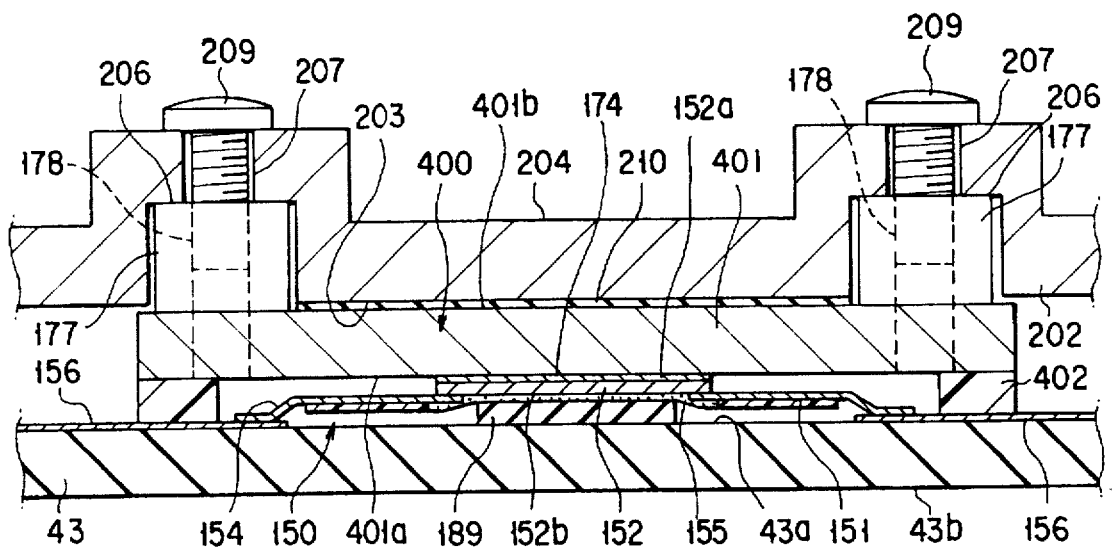
FIG. 36 is a cross-sectional view of a mounted portion of a TCP according to a second embodiment of the invention.

As is shown in FIG. 36, the TCP 150 is mounted on the top surface 43a of the first circuit board 43 in a so-called face-down position where the bottom surface 152b of the IC chip 152 is directed to the first circuit board 43. A plurality of connection pads 156 are provided on the top surface 43a of the first circuit board 43. The second end portions of the leads 154 of the TCP 150 are bonded to the connection pads 156 by means of soldering.

A heat conduction member 400 is attached to the top surface 43a of the first circuit board 43. The heat conduction member 400 comprises a heat conduction panel 401 and a support frame 402 bonded to the lower surface of the panel 401. The heat conduction panel 401 is formed of a metallic material with high heat conductivity such as an aluminum alloy and has a square plan shape greater than the TCP 150. The heat conduction panel 401 has a flat lower surface 401a opposed to the TCP 150 and an upper surface 401b serving as heat conduction surface exposed to the upper side of the first circuit board 43. The lower surface 401a of the heat conduction panel 401 is bonded to the surface 152a of the IC chip 152 by means of a heat conductive adhesive 174. The upper surface 401b of the heat conduction panel 401 is put in contact with the lower surface 203 of the heat radiation panel 202 with the heat conductive elastic sheet 210 interposed. The upper surface 401b has four corner portions provided with upwardly projecting boss portions 177, respectively. The support frame 402 is formed of a synthetic resin material. The support frame 402 is bonded to the top surface 43a of the first circuit board 43 and surrounds the connection region between the leads 154 of the TCP 150 and the connection pads 156.

In the second embodiment having the above structure, when the IC chip 152 has produced heat, the heat of the IC chip 152 is transmitted mainly to the heat conduction panel 401. Since the upper surface 401b of the heat conduction panel 401 is in contact with the heat radiation panel 202 of the heat sink 201 with the elastic sheet 210 interposed, the heat of the IC chip 152 is let to escape to the heat radiation panel 202 via the heat conduction panel 401.

Accordingly, a heat conduction path extending from the surface 152a of the IC chip 152 to the heat sink 201 via the heat conduction member 400 is constituted, and the heat of the TCP 150 can be radiated with high efficiency.

Figure 37:
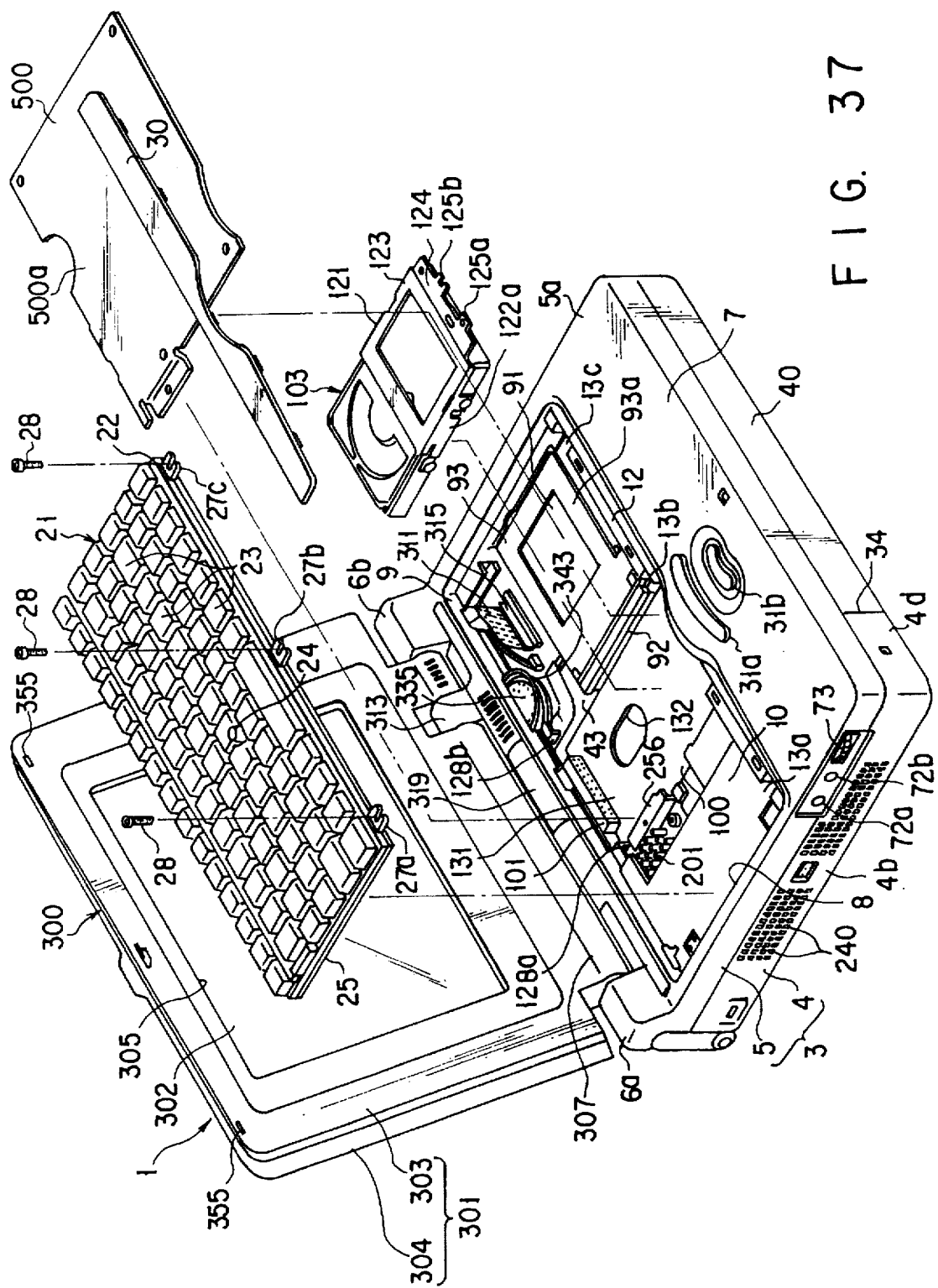
FIG. 37 is a perspective view of a portable computer according to a third embodiment of the invention, showing the state in which a keyboard and an HDD are removed from a casing.

FIG. 37 shows a third embodiment of the present invention.

The third embodiment has the same structure as the first embodiment except for the shape of a second heat radiation plate 500. As shown in FIG. 37, the second heat radiation plate 500 has such a size as to cover the card case 93 and HDD 103 from above. The second heat radiation plate 500 is situated on the same plane as the support wall 10 in the keyboard mounting hole 8. The second heat radiation plate 500 cooperates with the support wall 10 to constitute the bottom of the keyboard mounting hole 8. The second heat radiation plate 500 has a flat upper surface 500a which is put in contact with the lower surface of the reinforcement plate 25 of the keyboard 21. The contact region between the second heat radiation plate 500 and reinforcement plate 25 covers at least the right-hand half portion of the keyboard 21. Thus, substantially the entire lower surface of the reinforcement plate 25 of the keyboard 21 is supported by the support wall 10 and second heat radiation plate 500.

According to this structure, a sufficient contact area between the second heat radiation plate 500 and reinforcement plate 25 can be maintained, and the heat of the IC chip 152 conducted from the heat radiation panel 202 to the second heat radiation plate 500 can be let to escape over a broad range of the reinforcement plate 25. Thus, the radiation performance of the heat radiation panel 202 can be further increased.

Besides, since the second heat radiation plate 500 cooperates with the support wall 10 of the upper housing 5 to support substantially the entire lower surface of the keyboard 21 from below, the keyboard 21 can be firmly supported in the keyboard mounting hole 8. Thus, when the keys 23 are operated, the bending or vibration of the keyboard panel 22 can be prevented more effectively.

The portable electric apparatuses relating to the present invention are not limited to notebook-type portable computers, but include other types of portable information processing apparatuses such as word processors.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable electronic apparatus comprising:
    a box-shaped casing having a peripheral wall with cooling air inlets and an air outlet;
    a circuit board contained within said casing;
    a circuit element mounted on said circuit board and producing heat during operation;
    a heat conduction member attached to said circuit board, said heat conduction member being put in contact with said circuit element and receiving the heat of the circuit element;
    a metallic heat sink detachably attached to the heat conduction member, the heat sink including a heat radiation panel put in contact with the heat conduction member and a fan support portion formed integral with the heat radiation panel, the fan support portion being situated at an end portion of the heat radiation panel and situated adjacent to the air outlet of the casing; and
    a cooling fan, supported on the fan support portion of the heat sink and facing the air outlet, for guiding air coming into the casing through the cooling air inlets toward the heat radiation panel, and exhausting the air to the outside of the casing through the air outlet.

2. The portable electronic apparatus according to claim 1, wherein said casing has a bottom wall continuous with the peripheral wall, and said circuit board is situated in parallel to said bottom wall.

3. The portable electronic apparatus according to claim 2, wherein said circuit board has a first surface on which said circuit element is mounted, a second surface located opposite to said first surface, and an opening portion formed in said first and second surfaces, facing said circuit element and having an opening shape greater than said circuit element, said circuit board contained within the casing in a position where said first surface is directed to the bottom wall, and
    said heat conduction member is provided on said second surface of the circuit board, said heat conduction member has a heat receiving part located in said opening portion, and said heat receiving part has a heat receiving surface, exposed to the first surface of the circuit board, for receiving the heat of the circuit element.

4. The portable electronic apparatus according to claim 3, further comprising a sub-heat sink, provided on the first surface of the circuit board, for receiving the heat of the circuit element, the sub-heat sink being formed of a heat-conductive metallic material and put in contact with the bottom wall of the casing.

5. The portable electronic apparatus according to claim 6, wherein said circuit board has a connector for connection with a peripheral device and a metallic connector panel for supporting the connector, said connector panel and said heat radiation panel being connected to each other with a heat-conductive radiation plate interposed.

6. The portable electronic apparatus according to claim 5, wherein said heat radiation plate has a number of radiation fins, and said casing has a number of radiation holes facing the radiation plate.

7. The portable electronic apparatus according to claim 5, wherein said connector panel has an extended portion interposed between said circuit board and said bottom wall of the casing, said extended portion being connected to said sub-heat sink.

8. The portable electronic apparatus according to claim 1, wherein said heat radiation panel has a number of heat radiation projections.

9. The portable electronic apparatus according to claim 1, wherein said cooling fan comprises a rotor with blades, and a fan frame for supporting the rotor, said fan frame being formed of a heat-conductive metallic material and screwed down on said fan support portion.

10. The portable electronic apparatus according to claim 1, wherein said heat conduction member has a heat conduction surface on a side opposite to said circuit element, said heat conduction surface being put in contact with said heat radiation panel of the heat sink with a heat-conductive elastic sheet interposed.

11. The portable electronic apparatus according to claim 10, wherein said heat conduction member has a plurality of boss portions projecting from said heat conduction surface, and said heat radiation panel has a plurality of engaging portions with which said boss portions are engageable, said boss portions and said engaging portions being engaged, thereby positioning said heat conduction member and said heat sink.

12. The portable electronic apparatus according to claim 4, further comprising a cover supported on the first surface of the circuit board and interposed between the sub-heat sink and the circuit element, said cover having heat conductivity and being put in contact with the sub-heat sink and the circuit element.

13. The portable electronic apparatus according to claim 12, wherein said cover and said heat conduction member are opposed to each other with the circuit board interposed between and coupled to the cover and the heat conduction member by means of screws penetrating the circuit board, and said circuit element is interposed between said cover and said heat receiving surface of the heat conduction member.

14. The portable electronic apparatus according to claim 12, wherein said cover has a thermistor for measuring the temperature of the circuit element, said cooing fan being operated when the temperature of the circuit element measured by said thermistor has exceeded a predetermined value.

15. A portable electronic apparatus comprising:

a box-shaped casing having an upper wall in which a mounting portion is formed;

input means for inputting information, said input means being disposed in said mounting portion in the casing, the input means having a lower surface exposed to the inside of the casing via the mounting portion, said lower surface being covered with a metallic reinforcement plate;

a circuit board contained within the casing;

a circuit element mounted on said circuit board and producing heat during operation;

a heat sink, contained within the casing, for radiating the heat of the circuit element;

a cooling fan for guiding cooling air to the heat sink, said cooling fan being attached to said heat sink;

first heat conduction means, interposed between the heat sink and the circuit element, for conducting the heat of the circuit element to the heat sink; and second heat conduction means, interposed between the heat sink and the reinforcement plate of the input means, for transmitting the heat of the circuit element conducted to the heat sink to the reinforcement plate.

16. The portable electronic apparatus according to claim 15, wherein said heat sink comprises a metallic heat radiation panel for receiving the heat of the circuit element via said first heat conduction means, a number of radiation projections formed integral to the heat radiation panel, and a fan support portion formed integral to the heat radiation panel, and said cooling fan comprises a rotor with blades, and a fan frame for supporting the rotor, said fan frame being formed of a heat-conductive metallic material and screwed down on said fan support portion.

17. The portable electronic apparatus according to claim 16, wherein said heat radiation panel and said reinforcement plate of the input means cooperate to constitute a cooling air passage within the casing, said cooling air passage communicating with the cooling fan.

18. The portable electronic apparatus according to claim 15, further comprising:

a sub-heat sink contained within the casing and situated on a side opposite to the heat sink with the circuit board interposed; and third heat conduction means for conducting the heat of the circuit element to the sub-heat sink.

19. The portable electronic apparatus according to claim 15, further comprising:

a metallic connector panel supported on the circuit board; and fourth heat conduction means for transmitting the heat of the circuit element conducted to the heat sink to the connector panel.

20. A portable electronic apparatus comprising:

a box-shaped casing having an inner surface with radiation holes and an upper wall on which a mounting portion is formed;

input means for inputting information, said input means being disposed in said mounting portion in the casing, the input means having a lower surface exposed to the inside of the casing via the mounting portion, said lower surface being covered with a metallic reinforcement plate;

a circuit board contained within the casing;

a circuit element mounted on said circuit board and producing heat during operation; and heat conduction means, contained within the casing, for conduction of heat of the circuit element and contacting said circuit element, the heat conduction means having a portion releasing the heat of the circuit element to the reinforcement plate by contact therewith and a portion extending along the inner surface of the casing and such portion is adjacent to and facing the radiation holes.

* * * * *